United States Patent [19]
Leach et al.

[11] Patent Number: 5,805,885
[45] Date of Patent: Sep. 8, 1998

[54] METHOD AND SYSTEM FOR AGGREGATING OBJECTS

[75] Inventors: Paul Leach, Seattle; Antony S. Williams, Redmond; Edward Jung, Seattle; C. Douglas Hodges; Srinivasa R. Koppolu, both of Redmond; Barry B. MacKichan, Bainbridge Island; Craig Wittenberg, Mercer Island, all of Wash.

[73] Assignee: Microsoft Corporation, Redmond, Wash.

[21] Appl. No.: 185,465

[22] Filed: Jan. 24, 1994

Related U.S. Application Data

[63] Continuation-in-part of Ser. No. 996,552, Dec. 24, 1992, abandoned.

[51] Int. Cl.[6] ............................ G06F 15/163; G06F 9/00; G06F 9/46
[52] U.S. Cl. .............................................................. 395/683
[58] Field of Search ..................................... 395/650, 700, 395/683

[56] References Cited

U.S. PATENT DOCUMENTS

| | | | |
|---|---|---|---|
| 4,695,949 | 9/1987 | Thatte et al. ............................ | 364/200 |
| 5,041,992 | 8/1991 | Cunningham et al. ................. | 364/518 |
| 5,119,475 | 6/1992 | Smith et al. ............................ | 395/156 |
| 5,129,084 | 7/1992 | Kelly, Jr. et al. ....................... | 395/650 |

(List continued on next page.)

FOREIGN PATENT DOCUMENTS

| | | | |
|---|---|---|---|
| 0 474 339 A2 | 3/1992 | European Pat. Off. .......... | G06F 9/44 |
| 0 546 682 A3 | 6/1993 | European Pat. Off. .......... | G06F 9/44 |

OTHER PUBLICATIONS

Kiyooka, Gen, "Subclassing in OLE 2.0: It's Not Just an API Anymore: The Component Object Model of OLE 2.0 is the Beginning of Object–Oriented System Services," *BYTE*, vol. 19, No. 1, p. 237, Jan. 1994.

Reed, Harvey, "Object–Oriented Design by Orthogonality (Software design method)," *Computer Language*, vol. 9, n1, p. 51(4), Jan. 1992.

(List continued on next page.)

*Primary Examiner*—Alvin E. Oberley
*Assistant Examiner*—Peter Stecher
*Attorney, Agent, or Firm*—Seed and Berry LLP

[57] ABSTRACT

A method and system for aggregating objects within a computer system are provided. In a preferred embodiment, the method aggregates an enclosed object within an enclosing object. The enclosed object has an object management interface and an external interface, while the enclosing object has a controlling object management interface. The controlling object management interface and the external interface of the enclosed object have query function members for receiving an identifier of an interface and for returning a reference to the identified interface. A preferred embodiment creates an instance of an enclosing object and an object to be enclosed. In static aggregation, the controlling object management interface of the enclosing object knows in advance how to return an identifier to the external interface of the enclosed object. In dynamic aggregation, an object to be enclosed is added to the enclosing object after the enclosing object is instantiated. Once aggregated, when the query function member of the object management interface of the enclosed object receives an identifier of an interface, it invokes the query function member of the controlling object management interface forwarding the interface identifier and returns the reference to an interface returned by the invoked query function member of the controlling object management interface. In dynamic aggregation, rules for determining to which interface to return a reference can by added to the enclosing object and used by the query function member of the controlling object management interface.

14 Claims, 16 Drawing Sheets

U.S. PATENT DOCUMENTS

| | | | |
|---|---|---|---|
| 5,161,223 | 11/1992 | Abraham | 395/600 |
| 5,161,225 | 11/1992 | Abraham et al. | 395/600 |
| 5,212,787 | 5/1993 | Baker et al. | 395/600 |
| 5,237,654 | 8/1993 | Shackelford et al. | 395/160 |
| 5,297,284 | 3/1994 | Jones et al. | 395/700 |
| 5,485,617 | 1/1996 | Stutz et al. | 395/700 |
| 5,511,197 | 4/1996 | Hill et al. | 395/700 |

OTHER PUBLICATIONS

Stroustrup, Bjarne, "The C++ Programming Language," *Addison–Wesley*, $2^{nd}$ Edition, p. 32, 255, 256–258, 1991.

Stroustrup, Bjarne, "The C++ Programming Language," *Addison Wesley*, $2^{nd}$ Edition, pp. 248, 460–463, 466–472, 1991.

Almarode, J. "Rule–Based Delegation for Prototypes," *SIGNPLAN Notices*, V.24 No. 10, pp. 363–370, OOPSLA, Oct. 1989.

Arcidiacono, Tom, "Expert System On–Call," *PC Technical Journal*, V6, n. 11, p. 112(4), Nov. 1981.

Hopsman, Ross, G., "Object–based Hybrid Tools," *HP Professional*, V6, n5, p. 34(6), May 1992.

Bulman, David, "Refining Candidate Objects," *Computer Language*, V8, n1, p. 30(7), Jan. 1991.

Margaret Ellis & Bjaurne Stroustrup, The Annotated C++ Reference Manual, pp. 354–360, 1990.

Object–oriented languages for programmer, Pratap, Sesha, PC Week, v4, n19, p. 67 May–1987.

Duhl, J., Damon, C, A performance comparison of object and relational databases, SIGPLAN Notices, vol. 23, No. 11, pp. 153–161, Sep. 1988.

New–Wave Office, Lam–Beatrice, Hanson, Scott, Hewlett–Packard Journal v40, n4, p. 23, Aug. 1989.

Chien, Andrew A., "Concurrent Aggregates: Using Multiple–Access Data Abstractions to Manage Complexity in Concurrent Programs", *OOPS Messenger 2*, pp. 31–36, 1991.

Shimizu, K. et al., "Hierarcical Object Groups in Distributed Operating systems", *The 8th International Conference on Distributed Computing Systems*, pp. 18–24, 1988.

Hailpern, Brent et al., "Dynamic Reconfiguration in an Object–Based Programming Language with Distributed Shared Data", *11th International Conference on Distributed Computing Systems*, pp. 73–80, IEEE Computer Society Press, 1991.

Hailpern, Brent and Gail E. Kaiser, "Dynamic Reconfiguration in an Object–Based Programming Language with Distributed Shared Data," *International Conference on Distributed Computing Systems, Arlington, Texas, May 20–24, 1991*, IEEE, pp. 73–80.

Templ, J., "A Systematic Approach to Multiple Inheritance Implementation," *ACM SIGPLAN Notices*, vol. 28, No. 4, Apr., 1993, pp. 61–66.

METHOD AND SYSTEM FOR AGGREGATING OBJECTS

CROSS-REFERENCE TO RELATED APPLICATION

This application is a continuation in part for U.S. patent application Ser. No. 07/996,552, entitled "A Method and System for Aggregating Objects," which was filed on Dec. 24, 1992, now abandoned and which is hereby incorporated by reference.

TECHNICAL FIELD

This invention relates generally to a computer method and system of implementing interfaces to objects and, more specifically, to a method and system for aggregating objects.

BACKGROUND OF THE INVENTION

As computer software systems increase in sophistication, the cost of developing the software increases. To minimize the cost of software development, developers often share code. Prior development efforts use three types of code sharing: (1) source code sharing, (2) compiled code sharing, and (3) code sharing through inheritance.

Also, as computer software systems increase in sophistication, software users are faced with increasing complexity in the maintenance and extensibility of their computer systems. Each time a software vendor generates new or improved capabilities, a user who wishes to benefit must somehow incorporate these modifications. Prior systems generally require such a user to upgrade the software, forcing the user to reinstall at least part of the system. Or, prior systems require a software developer to plan in advance for future enhancements and install the necessary hooks in the original system to enable the loading of enhancements at some future time.

Moreover, if a user wishes to enhance the capabilities of a piece of currently owned software by adding capabilities produced by a different software vendor, the user is limited by what the software vendors planned in advance. Prior systems generally require that the two pieces of software be designed to work together and that at least one of the software pieces have knowledge of what capabilities the other provides. Thus, in prior systems, later modifications to code as well as the sharing of code must be accounted for in the software design.

Source and compiled code sharing have been widely used for many years. Source code sharing refers to the use of the same source code by various computer programs or by various versions of the same computer program. For example, a spreadsheet program typically includes source code to control the displaying of a spreadsheet. If a word processing program allows the embedding of a spreadsheet within a document, then the word processing program may use the same (or slightly modified) source code to display the embedded spreadsheet object. Source code sharing is typically used by a single developer who develops multiple computer programs. For competitive reasons, developers typically do not share their source code with other developers. Moreover, even if the developer does share source code, the recipient of source code typically modifies the source code and thus two versions of the source code are maintained.

Compiled code sharing refers to the use of the same compiled code by various computer programs. The compiled code is typically stored in a static or dynamic link library. Compiled code stored in a static link library is shared when a computer program is linked before execution. Compiled code stored in a dynamic link library is shared when a computer program is linked during execution. The developer of a spell checking program, for example, may share compiled code by compiling the program and storing the compiled code in a static link library. The static link library can then be distributed to developers of word processing programs who can link the compiled spell checking code into their word processing program. The developer of the spell checking program typically needs to modify the compiled code to meet special requirements of certain developers. These modifications tend to increase the complexity (and size) of the compiled code and may conflict with requirements of other recipients. Alternatively, the developer could distribute multiple versions of the static link library. However, the maintenance of multiple versions can be costly.

Object-oriented programming techniques employ a concept referred to as inheritance to allow the sharing of code. An overview of well-known object-oriented programming techniques is provided, since the present invention is described below using object-oriented programming. Two common characteristics of object-oriented programming languages are support for data encapsulation and data type inheritance. Data encapsulation refers to the binding of functions and data. Inheritance refers to the ability to declare a data type in terms of other data types.

In the C++ language, object-oriented techniques are supported through the use of classes. A class is a user-defined type. A class declaration describes the data members and function members of the class. For example, the following declaration defines data members and a function member of a class named CIRCLE.

```
class CIRCLE
{ public:
        int x, y;
        int radius;
        void draw();
};
```

Variables x and y specify the center location of a circle and variable radius specifies the radius of the circle. These variables are referred to as data members of the class CIRCLE. The function draw is a user-defined function that draws the circle of the specified radius at the specified location. The function draw is referred to as a function member of class CIRCLE. The data members and function members of a class are bound together in that the function operates on an instance of the class. An instance of a class is also called an object of the class.

In the syntax of C++, the following statement declares the objects a and b to be of type class CIRCLE.

CIRCLE a, b;

This declaration causes the allocation of memory for the objects a and b. The following statements assign data to the data members of objects a and b.

a.x=2;
a.y=2;
a.radius=1;
b.x=4;
b.y=5;
b.radius=2;

The following statements are used to draw the circles defined by objects a and b.

a.draw( );
b.draw( );

A derived class is a class that inherits the characteristics—data members and function members—of its base classes. For example, the following derived class CIRCLE_FILL inherits the characteristics of the base class CIRCLE.

```
class CIRCLE_FILL : CIRCLE
{ public:
        int pattern;
        void fill();
};
```

This declaration specifies that class CIRCLE_FILL includes all the data and function members that are in class CIRCLE in addition to those data and function members introduced in the declaration of class CIRCLE_FILL, that is, data member pattern and function member fill. In this example, class CIRCLE_FILL has data members x, y, radius, and pattern and function members draw and fill. Class CIRCLE_FILL is said to "inherit" the characteristics of class CIRCLE. A class that inherits the characteristics of another class is a derived class (e.g., CIRCLE_FILL). A class that does not inherit the characteristics of another class is a primary (root) class (e.g., CIRCLE). A class whose characteristics are inherited by another class is a base class (e.g., CIRCLE is a base class of CIRCLE_FILL). A derived class may inherit the characteristics of several classes, that is, a derived class may have several base classes. This is referred to as multiple inheritance.

A derived class may specify that a base class is to be inherited virtually. Virtual inheritance of a base class means that only one instance of the virtual base class exists in the derived class. For example, the following is an example of a derived class with two nonvirtual base classes.

class CIRCLE_1: CIRCLE { . . . };
   class CIRCLE_2: CIRCLE { . . . };
   class PATTERN: CIRCLE_1, CIRCLE_2{ . . . };

In this declaration class PATTERN inherits class CIRCLE twice nonvirtually through classes CIRCLE_1 and CIRCLE_2. There are two instances of class CIRCLE in class PATTERN.

The following is an example of a derived class with two virtual base classes.

class CIRCLE_1: virtual CIRCLE { . . . };
   class CIRCLE_2: virtual CIRCLE { . . . };
   class PATTERN: CIRCLE_1, CIRCLE_2{. . . };

The derived class PATTERN inherits class CIRCLE twice virtually through classes CIRCLE_1 and CIRCLE_2. Since the class CIRCLE is virtually inherited twice, there is only one object of class CIRCLE in the derived class PATTERN. One skilled in the art would appreciate virtual inheritance can be very useful when the class derivation is more complex.

A class may also specify whether its function members are virtual. Declaring that a function member is virtual means that the function can be overridden by a function of the same name and type in a derived class. In the following example, the function draw is declared to be virtual in classes CIRCLE and CIRCLE_FILL.

```
class CIRCLE
{ public:
        int x, y;
        int radius;
        virtual void draw();
};
class CIRCLE_FILL : CIRCLE
{ public:
        int pattern;
        virtual void draw();
};
```

If a virtual function is declared without providing an implementation, then it is referred to as a pure virtual function. A pure virtual function is a virtual function declared with the pure specifier, "=0". If a class specifies a pure virtual function, then any derived class needs to specify an implementation for that function member before that function member may be invoked.

In order to access objects, the C++ language provides a pointer data type. A pointer holds values that are addresses of objects in memory. Through a pointer, an object can be referenced. The following statement declares variable c_ptr to be a pointer on an object of type class CIRCLE and sets variable c_ptr to hold the address of object c.

CIRCLE *c_ptr;
   c_ptr=&c;

Continuing with the example, the following statement declares object a to be of type class CIRCLE and object b to be of type class CIRCLE_FILL.

CIRCLE a;
   CIRCLE_FILL b;

The following statement refers to the function draw as defined in class CIRCLE.

a.draw( );

Whereas, the following statement refers to the function draw defined in class CIRCLE_FILL.

b.draw( );

Moreover, the following statements type cast object b to an object of type class CIRCLE and invoke the function draw that is defined in class CIRCLE_FILL.

CIRCLE *c_ptr;
   c_ptr=&b;
   c_ptr→draw( ); // CIRCLE_FILL::draw( )

Thus, the virtual function that is called is function CIRCLE_FILL::draw.

FIG. 1 is a block diagram illustrating typical data structures used to represent an object. An object is composed of instance data (data members) and member functions, which implement the behavior of the object. The data structures used to represent an object comprise instance data structure 101, virtual function table 102, and the function members 103, 104, 105. The instance data structure 101 contains a pointer to the virtual function table 102 and contains data members. The virtual function table 102 contains an entry for each virtual function member defined for the object. Each entry contains a reference to the code that implements the corresponding function member. The layout of this sample object conforms to the model defined in U.S. patent application Ser. No. 07/682,537, entitled "A Method for Implementing Virtual Functions and Virtual Bases in a Compiler for an Object Oriented Programming Language," which is hereby incorporated by reference. In the following, an object will be described as an instance of a class as defined by the C++ programming language. One skilled in the art would appreciate that objects can be defined using other programming languages.

The inheritance of a class is a type of code sharing. A developer of a class can provide the implementation of the class to other developers. These other developers can then create classes that derive from the class provided. Thus, the function members of the provided class are shared. If, however, a class is inherited and a virtual function is overridden, then the testing of the overriding virtual function can be complex. The overriding virtual function can modify the state of the object in a way that affects non-overridden functions. Thus, each inherited function must be independently tested in conjunction with the testing of the overriding virtual function. To ameliorate the complexities of testing, the developers of a class implementation may distribute source code with the implementation. Unfortunately, the distribution of source code has the same drawbacks to sharing source code as discussed above.

An advantage of using object-oriented techniques is that these techniques can be used to facilitate the sharing of objects. In particular, object-oriented techniques facilitate the creation of compound documents. A compound document is a document that contains objects generated by various computer programs. (Typically, only the data members of the object and the class type are stored in a compound document.) For example, a word processing document that contains a spreadsheet object generated by a spreadsheet program is a compound document. A word processing program allows a user to embed a spreadsheet object (e.g., a cell) within a word processing document. To allow this embedding, the word processing program is compiled using the class definition of the object to be embedded to access function members of the embedded object. Thus, the word processing program would need to be compiled using the class definition of each class of objects that can be embedded in a word processing document. To embed an object of a new class into a word processing document, the word processing program would need to be recompiled with the new class definition. Thus, only objects of classes selected by the developer of the word processing program can be embedded. Furthermore, new classes can only be supported with a new release of the word processing program.

To allow objects of an arbitrary class to be embedded into compound documents, interfaces are defined through which an object can be accessed without the need for the word processing program to have access to the class definitions at compile time. An abstract class is a class in which there is at least one virtual function member with no implementation (a pure virtual function member). An interface is an abstract class with no data members and whose virtual functions are all pure. Thus, an interface provides a protocol for two programs to communicate. Interfaces are typically used for derivation: a program implements classes that provide implementations for the interfaces the classes are derived from. Thereafter, objects are created as instances of these derived classes.

The following class definition is an example definition of an interface. In this example, for simplicity of explanation, rather than allowing any class of object to be embedded in its documents, a word processing program allows spreadsheet objects to be embedded. Any spreadsheet object that provides this interface can be embedded, regardless of how the object is implemented. Moreover, any spreadsheet object, whether implemented before or after the word processing program is compiled, can be embedded.

```
class ISpreadSheet
{       virtual void File() = 0;
        virtual void Edit() = 0;
```

-continued

```
        virtual void Formula() = 0;
        virtual void Format() = 0;
        virtual void GetCell (string RC, cell *pCell) = 0;
        virtual void Data() = 0;
}
```

The developer of a spreadsheet program would need to provide an implementation of the interface to allow the spreadsheet objects to be embedded in a word processing document.

When the word processing program embeds a spreadsheet object, the program needs access to the code that implements the interface for the spreadsheet object. To access the class code, each implementation is given a unique class identifier. For example, code implementing a spreadsheet object developed by Microsoft Corporation may have a class identifier of "MSSpreadsheet," while code implementing a spreadsheet object developed by another corporation may have a class identifier of "LTSSpreadsheet." A persistent registry in each computer system is maintained that maps each class identifier to the code that implements the class. Typically, when a spreadsheet program is installed on a computer system, the persistent registry is updated to reflect the availability of that class of spreadsheet objects. So long as a spreadsheet developer implements each function member defined by the interface and the persistent registry is maintained, the word processing program can embed instances of the developer's spreadsheet objects into a word processing document. The word processing program accesses the function members of the embedded spreadsheet objects without regard to who has implemented them or how they have been implemented.

Various spreadsheet developers may wish, however, to implement only certain function members. For example, a spreadsheet developer may not want to implement database support, but may want to support all other function members. To allow a spreadsheet developer to support only some of the function members, while still allowing the objects to be embedded, multiple interfaces for spreadsheet objects are defined. For example, the interfaces IDatabase and IBasic may be defined for a spreadsheet object as follows.

```
class   IBasic
{       virtual void File() = 0;
        virtual void Edit() = 0;
        virtual void Formula() = 0;
        virtual void Format() = 0;
        virtual void GetCell (string RC, cell *pCell) = 0;
}
class   IDatabase
{       virtual void Data() = 0;
}
```

Each spreadsheet developer would implement the IBasic interface and, optionally, the IDatabase interface.

At run time, the word processing program would need to determine whether a spreadsheet object to be embedded supports the IDatabase interface. To make this determination, another interface is defined (that every spreadsheet object implements) with a function member that indicates which interfaces are implemented for the object. This interface is named IUnknown (and referred to as the unknown interface or the object management interface) and is defined as follows.

```
class IUnknown
{    virtual HRESULT QueryInterface
        (REFIID iid, void **ppv) = 0;
     virtual ULONG AddRef() = 0;
     virtual ULONG Release () = 0;
}
```

The IUnknown interface defines the function member (method) QueryInterface. The method QueryInterface is passed an interface identifier (e.g., "IDatabase") in parameter iid (of type REFIID) and returns a pointer to the implementation of the identified interface for the object for which the method is invoked in parameter ppv. If the object does not support the interface, then the method returns a false. The type HRESULT indicates a predefined status, the type REFIID indicates a reference to an interface identifier, and the type ULONG indicates an unsigned long integer.

Code Table 1

```
HRESULT XX::QueryInterface(REFIID iid, void **ppv)
{    ret = TRUE;
     switch (iid) {
        case IID_IBasic:
            *ppv = pIBasic;
            break;
        case IID_IDatabase:
            *ppv = pIDatabase;
            break;
        case IID_IUnknown:
            *ppv = this;
            break;
        default:
            ret = FALSE;
     }
     if(ret == TRUE) {AddRef();};
     return ret;
}
```

Code Table 1 contains C++ pseudocode for a typical implementation of the method QueryInterface for class XX, which inherits the class IUnknown. If the spreadsheet object supports the IDatabase interface, then the method QueryInterface includes the appropriate case label within the switch statement. The variables pIBasic and pIDatabase point to a pointer to the virtual function tables of the IBasic and IDatabase interfaces, respectively. The method QueryInterface invokes to method AddRef (described below) to increment a reference count for the object of class XX when a pointer to an interface is returned.

Code Table 2

```
void XX::AddRef() {refcount++;}
void XX::Release() {if(--refcount==0) delete this;}
```

The interface IUnknown also defines the methods AddRef and Release, which are used to implement reference counting. Whenever a new reference to an interface is created, the method AddRef is invoked to increment a reference count of the object. Whenever a reference is no longer needed, the method Release is invoked to decrement the reference count of the object and, when the reference count goes to zero, to deallocate the object. Code Table 2 contains C++ pseudocode for a typical implementation of the methods AddRef and Release for class XX, which inherits the class IUnknown.

The IDatabase interface and IBasic interface inherit the IUnknown interface. The following definitions illustrate the use of the IUnknown interface.

```
class IDatabase : public IUnknown
{ public:
    virtual void Data() = 0;
}
class IBasic : public IUnknown
{ public:
    virtual void File() = 0;
    virtual void Edit() = 0;
    virtual void Formula() = 0;
    virtual void Format() = 0;
    virtual void GetCell (string RC, cell *pCell) = 0;
}
```

FIG. 2 is a block diagram illustrating a sample data structure of a spreadsheet object using nested classes. The spreadsheet object comprises object data structure 201, IBasic interface data structure 203, IDatabase interface data structure 204, the virtual function tables 202, 205, 206 and methods 207 through 221. The object data structure 201 contains a pointer to the virtual function table 202 and pointers to the IIBasic and IDatabase interface. Each entry in the virtual function table 202 contains a pointer to a method of the IUnknown interface. The IBasic interface data structure 203 contains a pointer to the virtual function table 205. Each entry in the virtual function table 205 contains a pointer to a method of the IBasic interface. The IDatabase interface data structure 204 contains a pointer to the virtual function table 206. Each entry in the virtual function table 207 contains a pointer to a method of the IDatabase interface. Since the IBasic and IDatabase interfaces inherit the IUnknown interface, each virtual function table 205 and 206 contains a pointer to the methods QueryInterface, AddRef, and Release. In the following, an object data structure is represented by the shape 222 labeled with the interfaces through which the object may be accessed.

The following pseudocode illustrates how a word processing program determines whether a spreadsheet object supports the IDatabase interface.

if (pSpreadsheet→QueryInterface("IDatabase",
       &pIDatabase))
   // IDatabase supported else
   // IDatabase not supported The pointer pSpreadsheet is a pointer to an instance of the spreadsheet class shown in FIG. 2. (pSpreadsheet points to data structure 201.) If the object supports the IDatabase interface, the method QueryInterface defined by method 207 sets the pointer pIDatabase to point to the IDatabase data structure 204 and returns true as its value.

Normally, an object can be instantiated (an instance of the object created in memory) by a variable declaration or by the "new" operator. However, both techniques of instantiation need the class definition at compile time. A different technique is needed to allow a word processing program to instantiate a spreadsheet object at run time. One technique provides a global function CreateInstanceXX, which is defined in the following.

static void CreateInstanceXX (REFIID iid, void **ppv)=
       0;

The method CreateInstanceXX instantiates an object of class XX and returns a pointer ppv to the interface of the object designated by parameter iid.

SUMMARY OF THE INVENTION

It is a goal of the present invention to provide a method and system for aggregating objects.

It is another goal of the present invention to provide a method and system for dynamically modifying object behavior.

It is another goal of the present invention to provide a method and system for dynamically aggregating objects.

It is another goal of the present invention to provide a method and system for statically aggregating objects.

It is another goal of the present invention to provide a method and system for enclosing an object within another object while exposing an interface of the enclosed object to a client of the enclosing object.

It is another goal of the present invention to provide a method and system for enclosing an object within another object after the enclosing object is instantiated.

It is another goal of the present invention to provide a method and system for dynamically combining objects of different types into a single object.

It is another goal of the present invention to provide a method and system for implementing an object that can be either enclosed within another object or not enclosed within another object without modifying the implementation of the object.

It is another goal of the present invention to provide a method and system for implementing an aggregate object so that a client is unaware that the object is an aggregate.

It is another goal of the present invention to provide a method and system for enclosing objects wherein an enclosed object can itself be an enclosing object to an arbitrary level of enclosing.

It is another goal of the present invention to provide a method and system for enhancing a base object's behavior by adding a new interface to it.

It is another goal of the present invention to provide a method and system for enhancing a base object's apparent behavior by adding an interface to it that overrides standard behavior of the base object.

It is another goal of the present invention to provide a method and system for supplying default functionality to objects by enclosing them within an enclosing object where an enclosed or enclosing object implements the default functionality.

It is another goal of the present invention to provide a method and system for implementing controlling behavior over common functionality present in enclosed objects.

It is another goal of the present invention to provide a method and system for determining which interface to provide to a client when the client requests an interface that is implemented by more than one enclosed object.

These and other goals, which will be apparent as the invention is more fully described below, are provided by a method and system for aggregating objects within a computer system. In a preferred embodiment, the method aggregates an enclosed object within an enclosing object. The enclosed object has an object management interface and one or more external interfaces, while the enclosing object has a controlling object management interface. Each interface exposed to a client by the aggregate object has a query function member for receiving an identifier of an interface and for returning a reference to the identified interface. The query function member of the controlling object management interface of the enclosing object receives an identifier of an interface exposed by the enclosing object and returns a reference to the exposed interface. A preferred method creates an instance of the enclosed object. When, the query function member of an exposed interface of the enclosed object receives an identifier of an interface, it invokes the query function member of the controlling object management interface of the enclosing object passing the received identifier, and returns the reference returned by the invoked query function member of the controlling object management interface of the enclosing object as a reference to the identified interface.

In a preferred embodiment of static aggregation, a query function member of an enclosed object is implemented with knowledge of the external interfaces of the enclosed object and has no knowledge of interfaces (other than the controlling object management interface) of the enclosing object or other enclosed objects. The query function member of a controlling object management interface of the enclosing object is implemented with knowledge of the exposed interfaces of enclosed objects.

In a preferred embodiment of dynamic aggregation, an object can be modified dynamically by allowing interface instances, as implemented by objects, to be aggregated during the execution of a client program. Interfaces are aggregated by dynamically enclosing the objects that implement them into a multitype object. Each interface to be added is implemented by an object which has the ability to be aggregated. A multitype object is created to act as an enclosing object. The multitype object has an add interface function member, which can be used to aggregate interfaces by adding them to the enclosing multitype object. The multitype object also has an add object function member for aggregating all of the interfaces of an object. The multitype object also has a query function member for retrieving references to the added interfaces upon request from a client. This query function member is part of the controlling object management interface of the enclosing multitype object. Also, an instance of an object that implements the interface to be aggregated is created. During creation, a pointer to the enclosing multitype object is passed to the object to be enclosed to enable the enclosed object to communicate with the enclosing multitype object. The created object implementing the interface to be aggregated has a query function member, which supports retrieval of a reference to the interface to be aggregated. A preferred method invokes the add interface function member or the add object function member of the enclosing multitype object passing it a reference to the created object implementing the interface to be aggregated. Later, the query function member of the enclosing multitype object is invoked in order to retrieve a reference to the interface that has been aggregated.

DETAILED DESCRIPTION OF THE INVENTION

Figure 1:
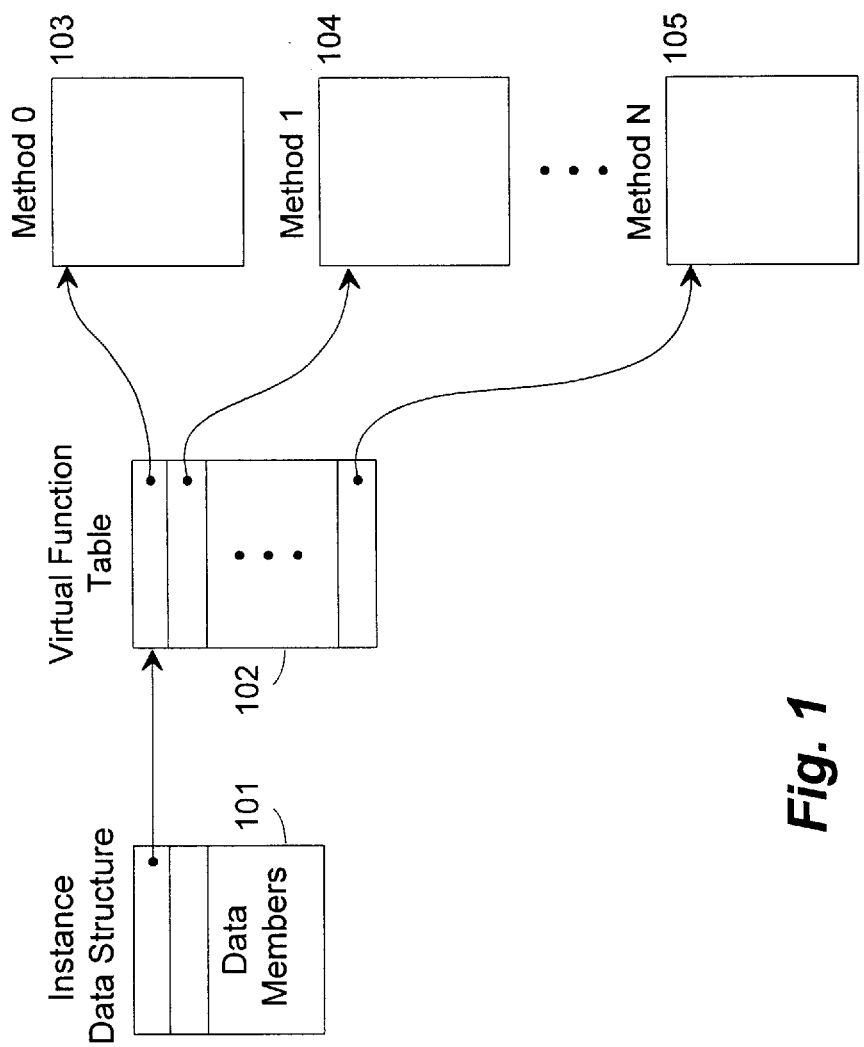
FIG. 1 is a block diagram illustrating typical data structures used to represent an object.
Figure 2:
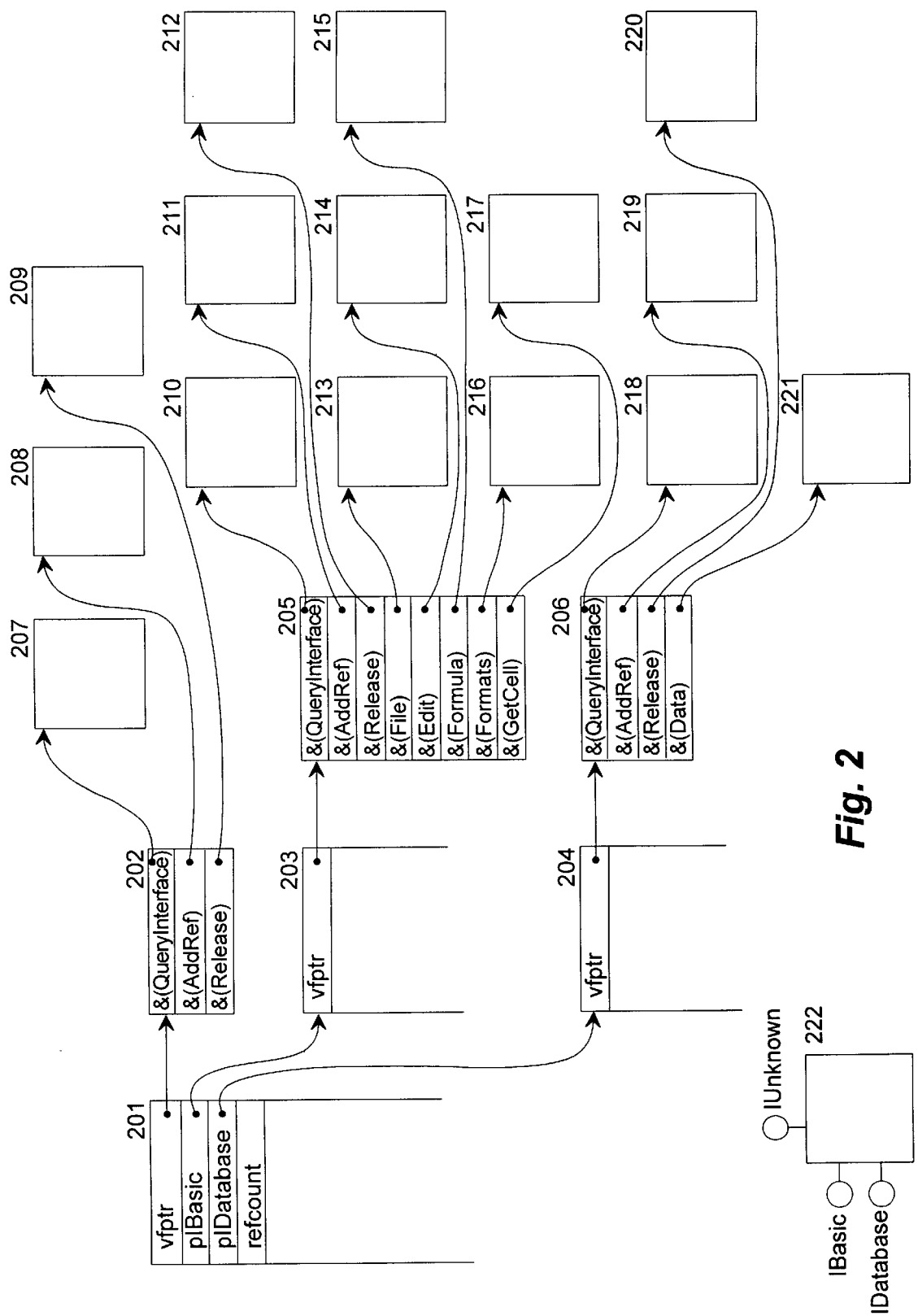
FIG. 2 is a block diagram illustrating a sample data structure of a spreadsheet object using nested classes.

The present invention provides a method in a computer system for aggregating objects. Objects can either be aggregated statically or dynamically. Using static aggregation, an enclosing object typically has compile time knowledge of the exposed interfaces of enclosed objects. The object management interface of the enclosing object is therefore customized to return interface pointers to exposed interfaces of enclosed objects using this knowledge. Instances of these statically aggregated objects are created dynamically (at run time).

Using dynamic aggregation, an enclosing object is instantiated and can be used to aggregate objects or interfaces at run time. The enclosing object has no a priori knowledge of the enclosed objects or interfaces, thus no compile time knowledge is used by the enclosing object. Similarly, the enclosed objects and interfaces have no knowledge of the implementation or the presence of interfaces of the enclosing object, with the exception of the controlling object management interface used to aggregate objects and interfaces. Also, a rules mechanism is provided to control access to aggregated objects and interfaces.

Each of these types of aggregation is discussed in turn in the following sections. In a preferred embodiment, the methods and systems of the present invention are implemented on a computer system comprising a central processing unit, memory, and input/output devices.

Static Aggregation

In a preferred embodiment of static aggregation, an aggregate object provides a plurality of interfaces to its clients. The computer program that instantiates an object is referred to as a client. An aggregate object comprises one or more enclosed objects and an implementation of the IUnknown interface, which is referred to as the controlling IUnknown interface of the aggregate object. An aggregate object exposes to its clients its own interfaces and interfaces from the enclosed objects. The method QueryInterface of the controlling IUnknown interface returns a pointer to each interface exposed by the aggregate object. The aggregate object instantiates each enclosed object. This instantiation can be performed during construction of the aggregate object or can be postponed until an interface of the enclosed object is requested. Each enclosed object contains a pointer to the controlling IUnknown interface. The method QueryInterface of an exposed interface of an enclosed object is preferably implemented to invoke the method QueryInterface of an IUnknown interface. When the enclosed object is implemented, the developer typically has no knowledge of what interfaces the enclosing object may expose. Consequently, the method QueryInterface of an enclosed object invokes the method QueryInterface of the controlling IUnknown interface to retrieve a pointer to the requested interface. The method QueryInterface of the controlling IUnknown interface is typically implemented with knowledge of all the exposed interfaces. When an object is not enclosed, the controlling IUnknown interface is the IUnknown interface of the object. Conversely, when an object is enclosed, the controlling IUnknown interface is the IUnknown interface of the enclosing object.

In a preferred embodiment, an aggregate object maintains a reference count. When the aggregate object is instantiated, its reference count is set to one. The method QueryInterface of the controlling IUnknown increments the reference count when a reference is returned to the client. The method AddRef of an exposed interface of an enclosed object invokes the method AddRef of the controlling IUnknown interface to increment the reference count of the aggregate object. Similarly, the method Release of an exposed interface of an enclosed object invokes the method Release of the controlling IUnknown interface to decrement the reference count of the aggregate object and delete the aggregate object when the reference count equals zero. When an enclosed object is instantiated, the reference count of the enclosed object is set to one. When the aggregate object is deleted, the method Release of the IUnknown interface of each enclosed object is invoked to delete the enclosed object.

Figure 3:
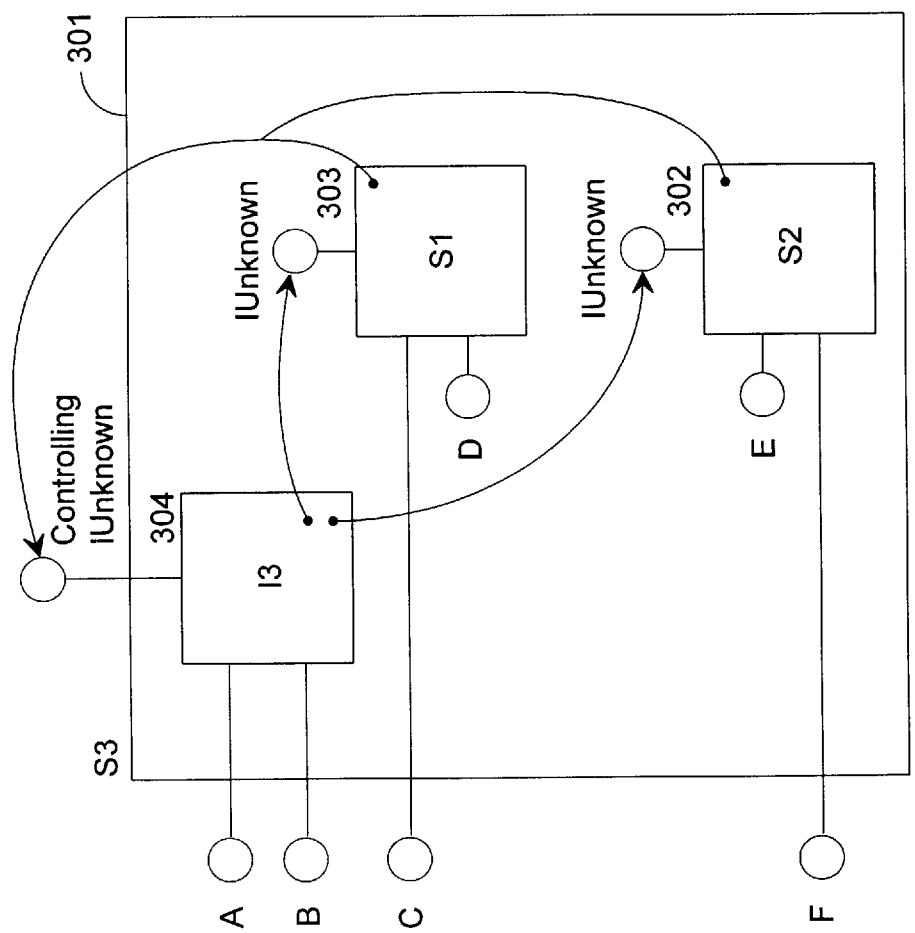
FIG. 3 is a block diagram showing an aggregate object.

FIG. 3 is a block diagram showing an aggregate object. The aggregate object S3 exposes interfaces A, B, C, F, and the controlling IUnknown. The aggregate (enclosing) object S3 comprises enclosed object S1 303, enclosed object S2 302, and implementation I3 304. The enclosed object S1 implements external interfaces C and D, and the enclosed object S2 implements external interfaces E and F. (An external interface is an interface of an object that can be exposed by an enclosing object. An internal interface is an interface of an object that cannot be exposed by an enclosing object.) The implementation I3 implements external interfaces A, B, and the controlling IUnknown. A client of the aggregate object S3 need not be aware that the object is an aggregate. The aggregate object S3 instantiates objects S1 and S2 either during construction of aggregate object S3 or at a later time. The implementation I3 contains pointers to the IUnknown interfaces of objects S1 and S2. Objects S1 and S2 are initialized to contain a pointer to the controlling IUnknown interface.

The method QueryInterface of an exposed interface can return a pointer to each exposed interface and increments the reference count of the aggregate object when a pointer is returned. The method QueryInterface of the controlling IUnknown has direct access to the pointers to the interfaces—A, B, and controlling IUnknown—that implementation I3 implements and invokes the method QueryInterface of the IUnknown interface of the enclosed objects to retrieve pointers to the exposed interfaces—C and F—of enclosed objects S1 and S2. When a pointer to an exposed interface is returned, the method QueryInterface of the controlling IUnknown interface increments the reference count of the aggregate object S3 by invoking the method AddRef of the controlling IUnknown interface. The method QueryInterface of each exposed interface (other than the controlling IUnknown interface) preferably invokes the method QueryInterface of the controlling IUnknown interface.

---

Code Table 3

```
void CreateInstanceS1 (IUnknown *punkOuter, REFIID iid, void **ppv)
{   IUnknown *punk;
    S1::CreateInstance (punkOuter, &punk);
    punk->QueryInterface (iid, ppv);
    punk->Release ();
```

Code Table 3

```
}
class IC: public IUnknown
{ // methods of IC} class ID: public IUnknown
{ // methods of ID} class S1: public IUnknown
{
public:
    static void CreateInstance(IUnknown *punkOuter,
    IUnknown ** ppunk)
    {    S1 *pS1 = new S1(punkOuter);
         pS1->QueryInterface(IID_IUnknown, ppunk),
    }
private:
    void S1(IUnknown *punkOuter) : m_C(this), m_D(this)
    {   if(punkOuter == NULL)
                    m_punkOuter = this;
        else
                    m_punkOuter = punkOuter;
        m_refcount = 0;
    } class C: public IC
    {
    public:
        void C(S1 *pS1) {m_S1 = pS1;} virtual boolean QueryInterface (REFIID iid, void **ppv)
        { return m_pS1->m_punkOuter->QueryInterface(iid, ppv);} virtual void AddRef()
        { m_pS1->m_punkOuter->AddRef();} virtual void Release()
        { m_pS1->m_punkOuter->Release();}

// other methods of IC private:
        S1              *m_pS1;
    }
    friend C;
    C   m_C;

class D: public ID
    {
    public:
        void D(S1 *pS1) {m_pS1 = pS1;} virtual boolean QueryInterface (REFIID iid, void **ppv)
        { return m_pS1->m_punkOuter->QueryInterface(iid, ppv);} virtual void AddRef()
        { m_pS1->m_punkOuter->AddRef();} virtual void Release()
        { m_pS1->m_punkOuter->Release();}

// other methods of ID private:
        S1              *m_pS1;
    }
    friend D;
    D   m_D;

public:
    virtual boolean QueryInterface (REFIID iid, void **ppv)
    {   ret = TRUE;
        switch (iid)
        { case IID_C:
                    *ppv = &m_C;
                    m_punkOuter->AddRef();
                    break;
          case IID_D:
                    *ppv = &m_D;
                    m_punkOuter->AddRef();
                    break;
          case IID_IUnknown:
                    *ppv = this;
                    AddRef();
                    break;
          default:
                    ret = FALSE;
        }
        return ret;
    } virtual void AddRef(){  m_refcount++;} virtual void Release() {if(--m_refcount == 0) delete this;} private:
    IUnknown        *m_punkOuter;
    int             m_refcount;
}
```

Figure 4:
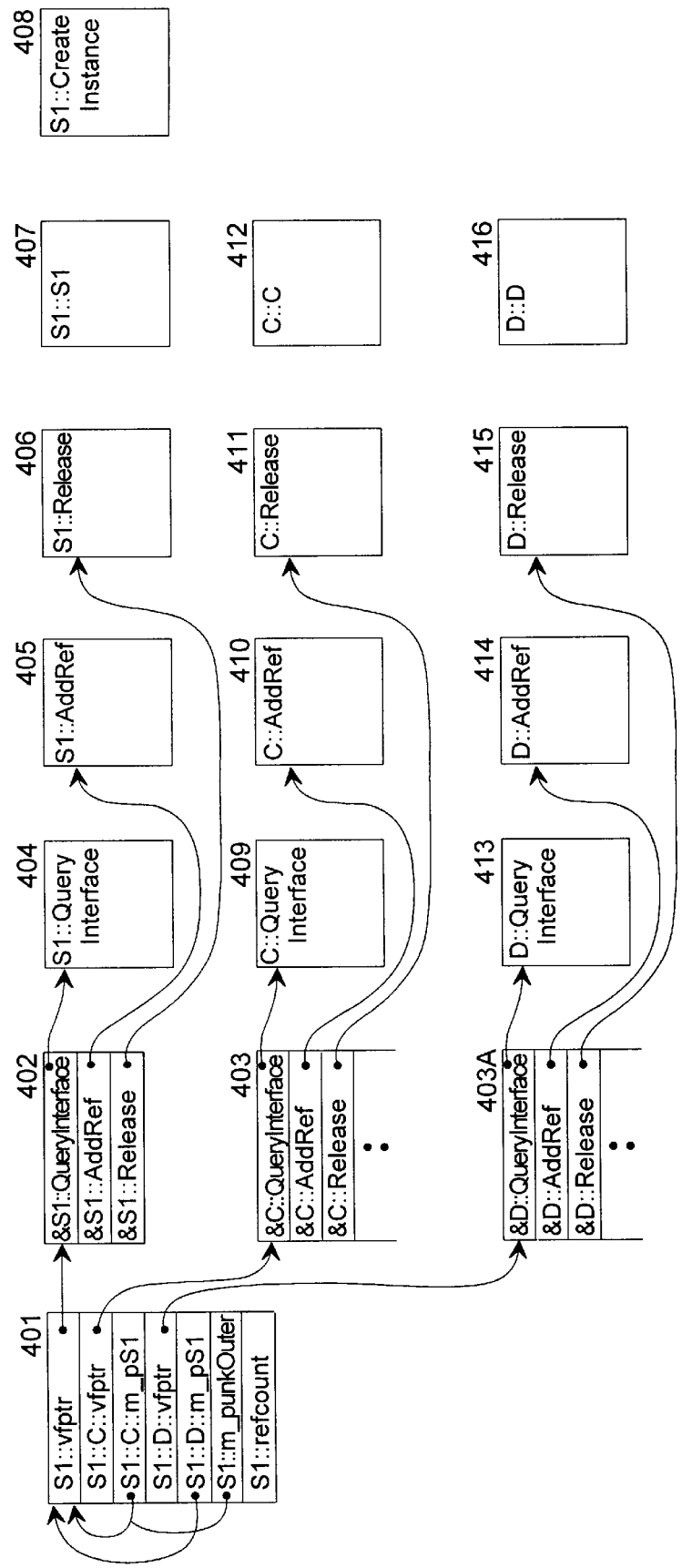
FIG. 4 is a block diagram of the data structure layout of an instance of an object of class S1.

Code Table 3 contains C++ pseudocode for a preferred class definition of the object S1, which can be enclosed in an aggregate (an aggregatable object) along with a global function that creates an instance of the object. The classes IUnknown, IC, and ID are interfaces that define the methods of each interface. The class S1 implements the IUnknown interface, the IC interface, and the ID interface. The class S1 implements the IC and ID interfaces as external interfaces. FIG. 4 is a block diagram of the data structure layout of an instance of an object of class S1. Instance structure 401 contains the data members of class S1 (m_C, m_D, m_punkOuter, m_refcount) and a pointer to the virtual function table pointer (S1::vfptr). The data members m_C and m_D are instances of an object of classes C and D, respectively. Classes C and D are friends of class S1, which allows C and D objects to access the private members of class S1. The virtual function table pointer S1::vfptr points to virtual function table 402, the virtual function table pointer within data member m_C S1::C::vfptr points to virtual function table 403, and the virtual function table pointer within data member m_D S1::D::vfptr points to virtual function table 403A. Virtual function table 402 contains pointers to the virtual functions defined for the IUnknown interface, virtual function table 403 contains pointer to the virtual functions defined for the C interface, and virtual function table 403A contains pointers to the virtual functions defined for D interface. The ellipsis in virtual function tables 403 and 403A indicates pointers to additional function members of classes C and D, respectively. Functions 404 through 408 are the function members of class S1. Function 407 is the constructor for class S1. Function 408 is the function CreateInstance for class S1. Functions 409 through 412 are the function members of class C. Function 412 is the constructor for class C. Functions 413 through 416 are the function members of class D. Function 416 is the constructor for class D.

As shown in Code Table 3, the method S1::QueryInterface returns a pointer to the interface C, the interface D, or the interface IUnknown. When a pointer to the interface C or interface D is returned, the method S1:QueryInterface invokes the method S1::AddRef to increment the reference count for the S1 object. The method S1::AddRef increments the reference count, and the method S1::Release decrements the reference count and deletes the S1 object when the reference count is zero. When a pointer to the interface C or interface D is returned, the method S1:QueryInterface invokes the method AddRef of the controlling IUnknown interface, which when the S1 object is not aggregated is the method S1::AddRef.

The global function CreateInstanceS1 creates an instance of an object of class S1. A client invokes this function to instantiate an object of class S1. Thus, a client can instantiate an object of class S1 without having access to the S1 class definition at compile time or run time. The function CreateInstanceS1 is passed a pointer to the controlling IUnknown (punkOuter) when the instantiated S1 object is enclosed within an aggregate object and an identifier (iid) of an interface to return. The function CreateInstanceS1 returns a pointer (ppv) to the identified interface. The function CreateInstanceS1 invokes the method S1:CreateInstance passing the parameter punkOuter. The method S1::CreateInstance instantiates an S1 object and returns a pointer (punk) to the IUnknown interface of the S1 object. The function CreateinstanceS1 invokes the method QueryInterface of the S1 object to retrieve a pointer to the identified interface. The function CreateInstanceS1 then invokes the method Release of the S1 object because the temporary pointer punk is no longer needed.

The method S1::CreateInstance instantiates an S1 object and returns a pointer (ppunk) to the IUnknown interface of the S1 object. The method S1::CreateInstance is passed a pointer (punkOuter) to the controlling IUnknown. The method S1::CreateInstance uses operator new to instantiate the S1 object. During instantiation, the constructor S1::S1 is invoked and passed the value of the parameter punkOuter. After the S1 object is constructed, the method S1::CreateInstance invokes the method S1::QueryInterface to retrieve a pointer to the IUnknown interface of the S1 object.

The constructor S1::S1 initializes the data members m_C, m_D, m_punkOuter, and m_refcount. The constructor S1::S1 is passed the parameter punkOuter. During instantiation of the data members m_C and m_D, the constructors C::C and D::D are invoked and passed the this pointer for the S1 object. If the value of the parameter punkOuter is NULL, the constructor S1::S1 sets the data member m_punkOuter to the value of the this pointer (which points to the newly instantiated S1 object). If the value of the parameter punkOuter is non-NULL, the constructor S1::S1 sets the data member m_punkOuter to the value of parameter punkOuter. Data member m_punkOuter points to the value of the controlling IUnknown of the aggregate when the S1 object is enclosed and points to the controlling IUnknown of the S1 object when the S1 object is not enclosed. The constructor S1::S1 also initializes the data member m_refcount to zero.

The constructor C::C is passed a pointer to the S1 object. The constructor C::C stores the passed pointer in data member C::m_pS1. The data member C::m_pS1 is used by the methods of class C to access the data member S1::m_ punkOuter.

The methods C::QueryInterface, C::AddRef, and C::Release invoke the corresponding methods of the IUnknown interface pointed to by data member S1::m_punkOuter, which when the S1 object is enclosed, points to the controlling IUnknown interface of the aggregate.

The constructor and other methods of class D are analogous to those of class C.

FIG. 4 shows an instance of an S1 object that is not part of an aggregate. The data members S1::C::m_pS1, S1::D::m_pS1, and S1::m_punkOuter are initialized to pointer to the S1 object itself. The methods QueryInterface, AddRef, and Release of the data members m_C and m_D invoke the IUnknown methods of the interface of the S1 object.

The S2 object that implements interfaces E and F is analogous to the S1 object as described above.

Code Table 4

```
void CreateInstanceS3 (IUnknown *punkOuter, REFIID iid, void **ppv)
{   IUnknown *punk;
    S3::CreateInstance (punkOuter, &punk);
    punk->Query Interface (iid, ppv);
    punk->Release ();
} class IA: public IUnknown
{ // methods of class IA} class IB: public IUnknown
{ // methods of class IB} class S3: public IUnknown
{
public:
    static void CreateInstance(IUnknown *punkOuter, IUnknown
    **ppunk)
    {   S3 *pS3 = new
        S3(punkOuter);
        CreateInstanceS1(pS3->m_punkOuter, IID_IUnknown,
        pS3->m_punkS1);
        CreateInstanceS2(pS3->m_punkOuter, IID_IUnknown,
        pS3->m_punkS2);
        pS3->QueryInterface(IID_IUnknown, ppunk);} private:
    void S3(IUnknown *punkOuter) : m_A(this), m_B(this)
    {   if (punkOuter == NULL)
            m_punkOuter = this;
        else
            m_punkOuter = punkOuter;
        m_refcount = 0;} void~S3()          {m_punkS1->Release();
                        m_punkS2->Release();} class A: public IA
    {
    public:
        void A(S3 *pS3) {m_pS3 = pS3} virtual boolean QueryInterface (REFIID iid, void **ppv)
        { return m_pS3->m_punkOuter->QueryInterface(iid, ppv);} virtual void AddRef()
        { m_pS3->m_punkOuter->AddRef();} virtual void Release()
        { m_pS3->m_punkOuter->Release();}

\\ other methods of IA private:
        S3   *m_pS3;
    };
    friend A;
    A    m_A;

class B: public IB
    {
    public:
        void B(S3 *pS3) {m_pS3 = pS3} virtual boolean QueryInterface (REFIID iid, void **ppv)
        { return m_pS3->m_punkOuter->QueryInterface(iid, ppv);} virtual void AddRef()
        { m_pS3->m_punkOuter->AddRef();} virtual void Release()
```

-continued

Code Table 4

```
    { m_pS3->m_punkOuter->Release();}

\\ other methods of IB private:
        S3    *m_pS3;
    };
    friend B;
    B    m_B;

public:
    virtual boolean QueryInterface(REFIID iid, void **ppv)
        {   ret = TRUE;
            switch (iid)
            { caseIID_C:
                    ret = m_punkS1->QueryInterface(iid, ppv);
                    break;
                caseIID_F:
                    ret = m_punkS2->QueryInterface(iid, ppv);
                    break;
                case IID_A:
                    *ppv = &m_A;
                    m_punkOuter->AddRef();
                    break;
                case IID_B:
                    *ppv = &m_B;
                    m_punkOuter->AddRef();
                    break;
                case IID_IUnknown:
                    *ppv = this;
                    AddRef();
                    break;
                default:
                    ret = FALSE;
            }
            return ret;
        } virtual void AddRef() {m_refcount++;}
    virtual void Release() {if (--m_refcount == 0) delete this;} private:
    IUnknown       *m_punkOuter;
    int            m_refcount;
    IUnknown       *m_punkS1:
    IUnknown       *m_punkS2;
};
```

Code Table 4 contains C++ pseudocode for a preferred class definition of an aggregate object. The class S3 exposes the interfaces IUnknown, A, B, C, and F. To provide the C interface, the class S3 encloses an S1 object and exposes the C interface. To provide the F interface, the class S3 encloses an S2 object and exposes the F interface. The S3 object exposes the C and F interfaces by returning pointers to the C and F interfaces through the method QueryInterface of the controlling IUnknown interface. The D interface of the S1 object and the E interface of the S2 object are external interfaces, but the S3 object does not expose these interfaces.

The methods S3::QueryInterface, S3::AddRef, and S3::Release compose the controlling IUnknown interface for the aggregate. The method S3::QueryInterface returns a pointer to the controlling IUnknown, A, B, C, or F interfaces. When a pointer to the controlling IUnknown interface is returned, the method S3::QueryInterface invokes the method S3::AddRef to increment the reference count for the S3 object. The method S3::AddRef increments the reference count, and the method S3::Release decrements the reference count and deletes the S3 object when the reference count is zero. When a pointer to the A, B, C, or F interfaces is returned, the method S3::QueryInterface invokes the method AddRef of the controlling IUnknown interface, which when the S3 object is not aggregated is the method S3::AddRef.

The global function CreateInstanceS3 creates an instance of an object of class S3. A client invokes this function to instantiate an object of class S3. Thus, a client can instantiate an object of class S3 without having access to the S3 class definition at compile time or run time. The function CreateInstanceS3 is passed a pointer to the controlling IUnknown interface (punkOuter) when the instantiated S3 object is enclosed within an aggregate object and an identifier (iid) of an interface exposed by the class S3 to return. The function CreateInstanceS3 returns a pointer (ppv) to the identified interface. The function CreateInstanceS3 invokes the method S3::CreateInstance passing the parameter punkOuter. The method S3::CreateInstance instantiates an S3 object and returns a pointer (ppunk) to the IUnknown interface of the S3 object. The function CreateInstanceS3 then invokes the method S3::QueryInterface to retrieve a pointer to the identified interface. The function CreateInstanceS3 then invokes the method S3::Release because the temporary pointer punk is no longer needed.

The method S3::CreateInstance instantiates an S3 object and returns a pointer (ppunk) to the IUnknown interface of the S3 object. The method S3::CreateInstance is passed a pointer (punkOuter) to the controlling IUnknown. The method S3::CreateInstance uses operator new to instantiate the S3 object. During instantiation, the constructor S3::S3 is invoked and passed the value of the parameter punkOuter. After the S3 object is constructed, the method S3::CreateInstance invokes the function CreateInstanceS1 to create the enclosed S1 object. The method S3::CreateInstance passes the parameter pS3→m_punkOuter and the interface identifier for the IUnknown interface and is returned a pointer to the IUnknown interface of the S1 object. The method S3::CreateInstance stores the returned pointer in data member S3::m_punkS1. The method S3::CreateInstance then invokes the function CreateInstanceS2 to create an S2 object in a manner analogous to the creation of the S1 object. The method S3::CreateInstance invokes the method S3::QueryInterface to retrieve a pointer to the IUnknown interface.

The method S3::AddRef increments the reference count of the S3 object. The method S3::Release decrements the reference count. When the reference counts is zero, the method S3::Release deletes the S3 object.

The constructor S3::S3 initializes the data members m_A, m_B, m_punkOuter, and m_refcount. The constructor S3::S3 is passed the parameter punkOuter. During instantiation of the data members m_A and m_B, the constructors A::A and B::B are invoked and passed the this pointer for the S3 object. If the value of the parameter punkOuter is NULL, the constructor S3::S3 sets the data member m_punkOuter to the value of the this pointer (which points to the newly instantiated S3 object). If the value of the parameter punkOuter is non-NULL, the constructor S3::S3 sets the data member m_punkOuter to the value of parameter punkOuter. Data member m_punkOuter points to the value of the controlling IUnknown interface of the aggregate when the S3 object is enclosed and points to the IUnknown interface of the S3 object when the S3 object is not enclosed. The constructor S3::S3 initializes the data member m_refcount to zero.

The destructor S3::~S3 invokes the method S1::Release to decrement the reference count of the enclosed S1 object. Since the reference count was set to one during instantiation of the S1 object, the method S1::Release deletes the S1 object. The destructor S3::~S3 decrements the reference count of the S2 object in an analogous manner.

The methods of the A and B interfaces have an analogous behavior to the methods of the C interface. Thus, the A and B interface can be exposed when an S3 object is enclosed.

Figure 5:
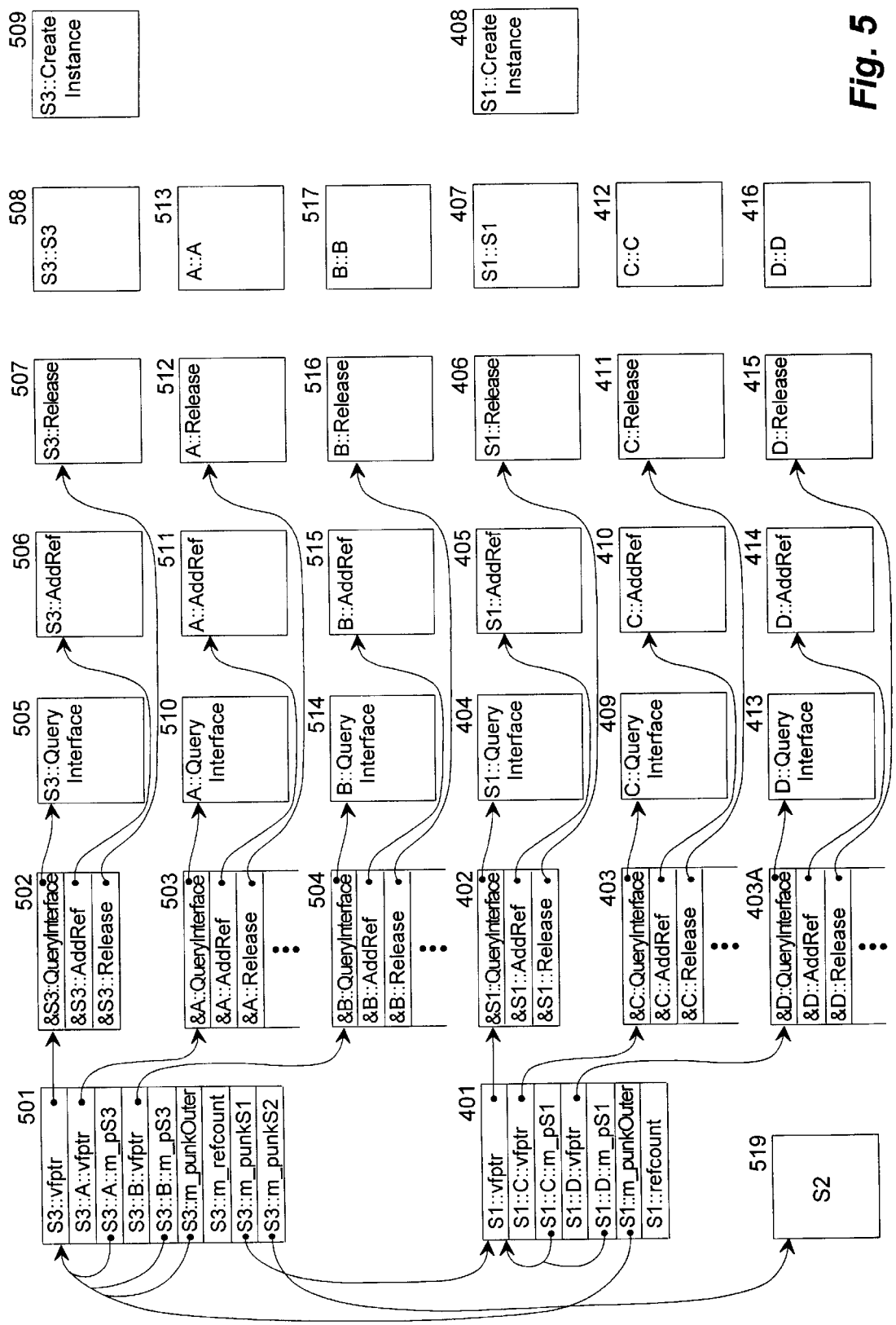
FIG. 5 is a block diagram of the data structure layout of an object of class S3.

FIG. 5 is a block diagram showing the data structure layout of an S3 object. The data structure layout comprises instance data 501, virtual function tables 502, 503, and 504, methods 505 through 517, and instances of an S1 object 401–416 and an S2 object 519. The instance data 501 contains a pointer to the virtual function table for the controlling IUnknown interface, data members m__A and m__B which are instances of class A and B, data member m__punkOuter which points to the IUnknown interface of the S3 object, data member m__refcount which contains the reference count for the S3 object, data member m__punkS1 which points to the IUnknown interface of the enclosed S1 object, and data member m__punkS2 which points to the IUnknown interface of the enclosed S2 object 519. When the enclosed S1 object is instantiated, its data member S1::m__punkOuter is initialized to point to the IUnknown interface of the S3 object. Similarly, when the enclosed S2 object is instantiated, its data member S2::m__punkOuter is initialized to point to the IUnknown interface of the S3 object.

Figure 6A:
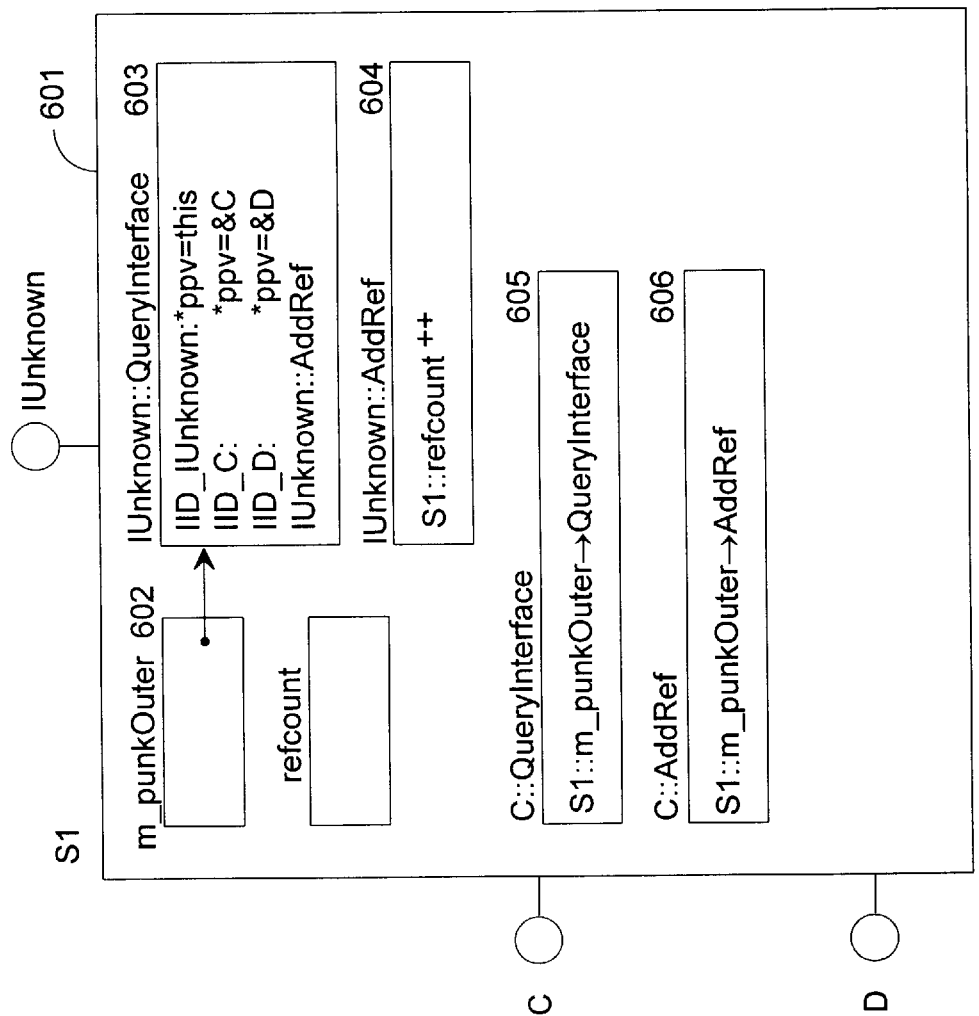
FIGS. 6A and 6B are block diagrams illustrating the cooperation between an enclosing object and an enclosed object.
Figure 6B:
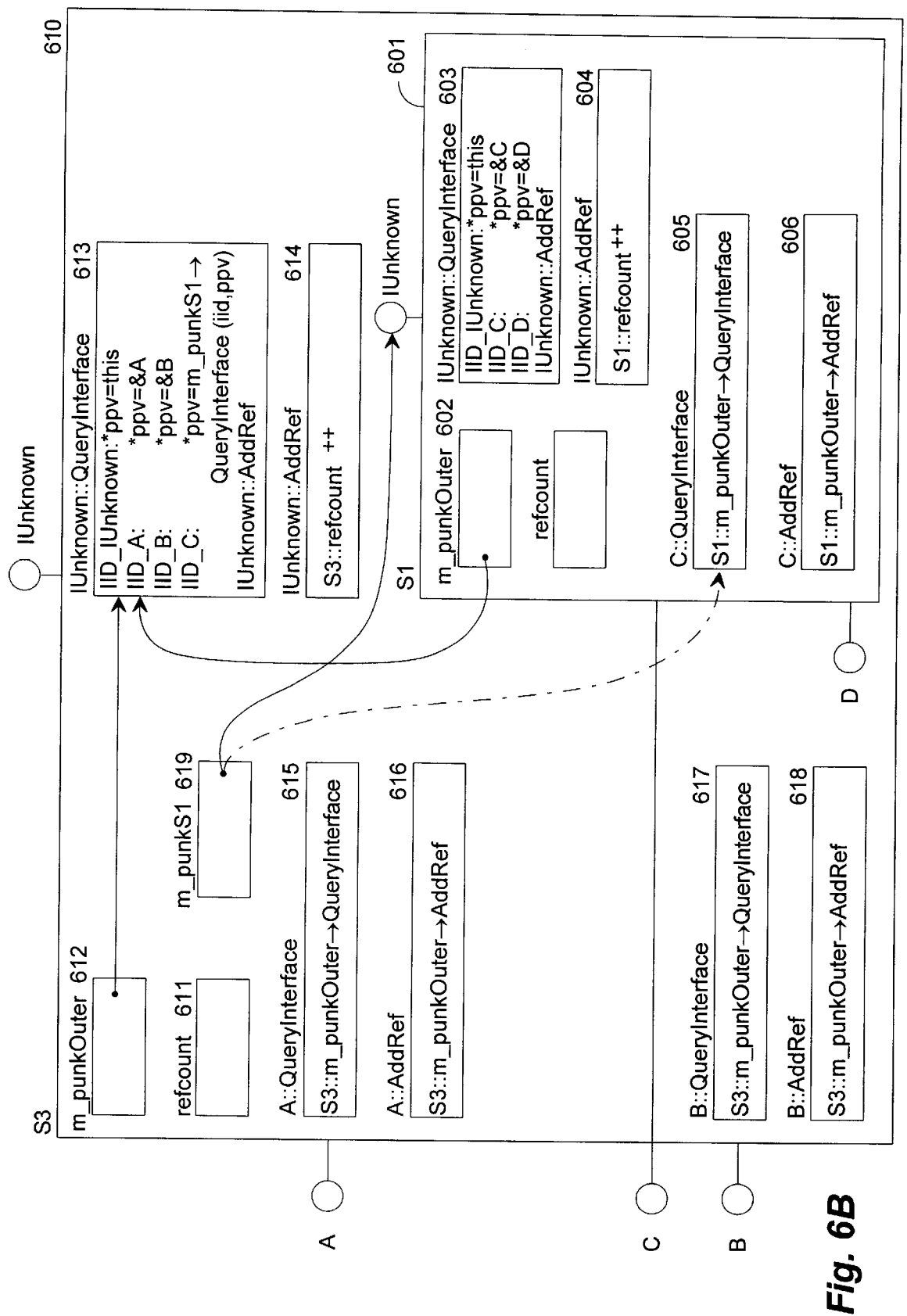

FIGS. 6A and 6B are block diagrams illustrating the cooperation between an enclosing object and an enclosed object. FIG. 6A is a block diagram illustrating an object of class S1 that is not enclosed within another object. The class S1 object 601 includes data member m__punkOuter, which points to the IUnknown interface and methods 603, 604, 605, and 606. The method IUnknown::QueryInterface 603 returns a pointer to the requested interface and increments the reference count. The methods C::QueryInterface 605 and C::AddRef 606 invoke the corresponding methods of the IUnknown interface. The implementation of the methods of class D (not shown) are analogous to those of class C. FIG. 6B is a block diagram illustrating an object of class S3 that encloses objects of class S1 and S2. The S2 object, which is analogous to the S1 object, is not shown. The data member m__punkOuter 602 of the class S1 object 601 points to the IUnknown interface of the class S3 object 610. The method IUnknown::QueryInterface 613 returns a pointer to each of the exposed objects and invokes the method IUnknown-::QueryInterface 603 pointed to by data member m__punkS1 619 to retrieve a pointer to the C interface. The data member m__punkOuter 612 points to the IUnknown interface of the class S3 object 610. The methods QueryInterface 615 and 617 of the class A and B objects invoke the methods pointed to by data member m__punkOuter 612.

In the above-described embodiment of the present invention, the method QueryInterface of the controlling IUnknown interface of an aggregate invokes the method QueryInterface of the IUnknown interface of enclosed objects to retrieve pointers to the exposed interfaces. In an alternate embodiment of the present invention, an enclosing object can cache pointers to interfaces of enclosed objects that the enclosing object exposes. Thus, when the method QueryInterface of the controlling IUnknown is invoked, the method can retrieve and return the cached pointers after calling the method AddRef of the controlling IUnknown interface, rather than invoke the method QueryInterface of the IUnknown interface of the enclosed object. To implement this alternate embodiment, an enclosing object defines a data member for each cached pointer. When the enclosed object is instantiated (typically during construction of the enclosing object), the method QueryInterface of the IUnknown interface of the enclosed object is invoked to retrieve a pointer of the exposed interface. It is preferred that the retrieved pointer is not reference counted so that the enclosing object effectively maintains only one pointer (e.g., S3::m__punkS1) to an enclosed object. The enclosed object can then be deleted by a single call to the method Release. Therefore, after the pointer is cached, the method Release of the exposed interface is invoked to remove the reference count attributable to the cached pointer.

In the above-described embodiment of the present invention, the implementation of the method QueryInterface of the controlling IUnknown interface includes a switch statement that specifies which interfaces are exposed. For example, the switch statement of the method S3::QueryInterface includes a case label for each exposed interface A, B, C, F, and the controlling IUnknown. Thus, the exposed interfaces are statically defined during implementation of the enclosing object. In an alternate embodiment, the method QueryInterface of the controlling IUnknown interface can be implemented without specific knowledge of the external interfaces of the enclosed objects. When the method QueryInterface is requested to return a pointer to an interface that it does not implement, the method can invoke the method QueryInterface of the IUnknown interfaces of the enclosed objects to retrieve a pointer to the identified interface, if implemented by an enclosed object. Code Table 5 contains C++ pseudocode for a preferred implementation of the method QueryInterface of the controlling IUnknown of a S3 object that implements this alternate embodiment. In addition to returning a pointer to each external interface of the enclosed objects, the method QueryInterface of the controlling IUnknown could be implemented to not expose certain external interfaces, while exposing all other external interfaces.

Code Table 5

```
virtual boolean QueryInterface (REFIID iid, void **ppv)
{ ret = TRUE;
switch (iid)
{ case IID__A:
        *ppv = &m__A;
        m__punkOuter->AddRef();
        break;
case IID__B:
        *ppv = &m__B;
        m__punkOuter->AddRef();
        break;
case IID__IUnknown:
        *ppv = this;
        AddRef();
        break;
default:
        if (m__punkS1->QueryInterface (iid, ppv)) { return ret;};
        if (m__punkS2->QueryInterface (iid, ppv)) { return ret;};
        ret = FALSE;
}
return ret;
}
```

In the above-described embodiments, error checking has not been described. It is preferred that various types of error checking are performed to ensure that an aggregate is properly created. For example, if an enclosing object tries to enclose an object that is not aggregatable, then the instantiation of the enclosing object should fail (e.g., the function CreateInstanceS1 returns a flag indicating failure).

In the above-described embodiments, an aggregate object can itself be an enclosed object within an enclosing object. This enclosing (nesting) can occur to any depth. Alternately, an aggregate object can be implemented to be non-aggregatable. The function CreateInstanceXX for the class XX can return a flag indicating a failure when the parameter punkOuter is non-null, that is, when aggregation is desired.

In the above-described embodiment, an object for each external interface of an aggregable object is instantiated as a data member of the aggregable object. In an alternate embodiment, the external interfaces are inherited by the aggregable object, rather than implemented as data members of the aggregable object. Code Table 6 contains C++ pseudocode for a preferred class definition S1 of an aggregable class with external interfaces C and D. The class S1 inherits the abstract classes IC and ID. The implementations of the IC and ID interfaces need not store a pointer to the derived class S1 to access the data member m__punkOuter, but a special, non-inherited implementation of the IUnknown interface (IUnknownS1) is needed. Conversely, the implementations of the IC and ID interfaces, as shown in Code Table 3, store the pointer to the derived class S1 in the data member m__pS 1. One skilled in the art would appreciated that other implementations using inheritance of interfaces are possible.

Code Table 6

```
class S1 : public IC, public ID
{ public:
        virtual boolean QueryInterface (REFIID iid, void **ppv)
        { return m__punkOuter->QueryInterface(iid, ppv);}
        virtual void AddRef()
        { m__punkOuter->AddRef();}
        virtual void Release()
        { m__punkOuter->AddRef();}
        // implementation of IC and ID
private:
        class IUknownS1 : public IUnknown
        {
        public:
                IUnknownS1 (S1 *pS1)
                { m__pS1 = pS1;
                m__refcount = 0;}
                virtual boolean QueryInterface (REFIID iid, void **ppv)
                {ret = TRUE;
                switch (iid)
                {case IID__IUnknown:
                        *ppv = this;
                        AddRef();
                        break;
                case IID__C:
                        *ppv = (IC *)m__pS1;
                        m__pS1->m__punkOuter->AddRef();
                        break;
                case IID__D:
                        *ppv = (ID *)m__pS1;
                        m__pS1->m__punkOuter->AddRef();
                        break;
                default:
                        ret = FALSE;
                };
                }
                virtual void AddRef() {m__refcount++;}
                virtual void Release() {if(--m__refcount == 0)
                        delete m__pS1;}
        private:
                int     m__refcount;
                S1      m__pS1;
        }
        friend IUnknownS1;
        IUnknownS1      m__IUnknownS1;
public:
        static void CreateInstance (IUunknown *punkOuter,
            IUnknown **ppunk)
        {       S1 *pS1 = new S1(punkOuter);
                pS1->QueryInterface(IID__Unknown,ppunk);
        }
private:
        void S1 (IUnknown *punkOuter) : m__IUnknownS1(this)
        {       if(punkOuter == NULL)
                        m__punkOuter = &m__IUnknownS1;
                else
                        m__punkOuter = punkOuter;
        }
        IUnknown        m__punkOuter;
}
```

Dynamic Aggregation

In a preferred embodiment of dynamic aggregation, interface instances are combined by adding them to an enclosing object at any time after the creation of the enclosing object. In this manner, a new or changed interface can be combined with an existing (base) object to alter the apparent behavior of the base object after the code for the base object has been compiled or linked. That is, although the behavior of the base object (as implemented by the methods of the base object) appears outwardly to have changed, the methods implementing the behavior of the base object have not actually changed. The base object is enclosed within the enclosing object and the new or changed interfaces are thereafter added.

When an external request is made to access to a particular interface, the enclosing object is responsible for determining which interface to return and how to invoke the requested interface if more than one matching interface exists. For example, if three IPrint interfaces exist in the aggregate object, the enclosing object determines which IPrint interface to return or whether to return its own IPrint interface, which knows how to invoke a combination of the methods of the other IPrint interfaces. The enclosing object can make this determination either from a fixed or specifiable set of combining rules.

These combining rules can be used to override the standard behavior of an enclosed base object by providing access to a new implementation of a previously defined interface of the enclosed base object. These rules can also be used to enhance the behavior of an enclosed base object by adding capabilities not initially defined as part of the enclosed base object. Both override and enhancement capabilities are provided by adding a new or changed interface to the base object. In addition to these capabilities, a standard enclosing object can implement default behaviors for enclosed objects (interfaces that implement methods to invoke if not provided for by the enclosed objects or added interfaces). Or, a standard enclosing object can implement controlling (overriding) behavior for a method typically present for all enclosed objects (such as printing).

In a preferred embodiment, an object can be modified dynamically by allowing interface instances (implemented by objects) to be aggregated together during the execution of a client program. The computer program that instantiates an object is a client program. Aggregation is the process of combining the capabilities of several distinct objects by enclosing their respective interfaces within an enclosing object. The enclosing object is then responsible for supporting access to all interfaces it wishes to expose through the enclosing object's implementation of a controlling IUnknown interface.

Static aggregation requires that the enclosing object have advance knowledge of the interfaces (objects) it wishes to aggregate. Using static aggregation, a programmer decides, in advance, which of its aggregate object interfaces the enclosing object should expose and then implements the QueryInterface method of the controlling IUnknown of the enclosing object to return pointers to these exposed interfaces when requested. The QueryInterface method of the controlling IUnknown accomplishes this task by maintaining references to the corresponding IUnknown interfaces of the individual enclosed objects. (These references are created when the enclosing object instantiates enclosed objects.) When a request is received for a reference to an exposed interface of one of the enclosed objects, the QueryInterface method of the controlling IUnknown invokes the corresponding IUnknown interface of the enclosed object to respond to the request. Because enclosed objects have no knowledge of what interfaces the enclosing object exposes, all external requests received by an enclosed object are passed on to the enclosing object, thereby enabling access to the interfaces defined in the other enclosed objects aggregated together.

The present invention also supports the dynamic aggregation of interfaces. In a preferred embodiment, an enclosing object provides a method for registering instantiated interfaces and for later retrieving references to them. In addition, when an interface is requested from the aggregate object, the present invention provides a method for modifying the determination of which interface(s) to retrieve and how to invoke them in combination if more than one instance of the same interface is present in the aggregate object.

In a preferred embodiment, dynamic aggregation is implemented using a multitype object. A multitype object is an object capable of aggregating objects of varying types, hence its name. Only interfaces that have been coded such that they are capable of being aggregated can be enclosed within a multitype object. (That is, for example, such interfaces can forward interface and reference counting requests to an enclosing object.) A multitype object provides an IMultitype interface for requesting the aggregation of particular interfaces or objects and for adding rules to determine how to invoke a requested interface. Code Table 7 contains pseudocode for a preferred definition of the IMultitype interface.

Code Table 7

```
class IMultiType: public IUnknown {
    virtual HRESULT AddObject (ULONG list,
        BOOLEAN headoflist,
    IUnknown *punkobj) = 0;
        virtual HRESULT AddInterface (REFIID iid, ULONG list,
            BOOLEAN headoflist, void **ppv = 0;
        virtual HRESULT AddRule (REFIID iid, IRULE *prule) = 0;
        virtual Enum (ULONG i; REFIID iid, ULONG list,
            BOOLEAN headoflist; void **ppv) = 0;
}
```

Figure 7A:
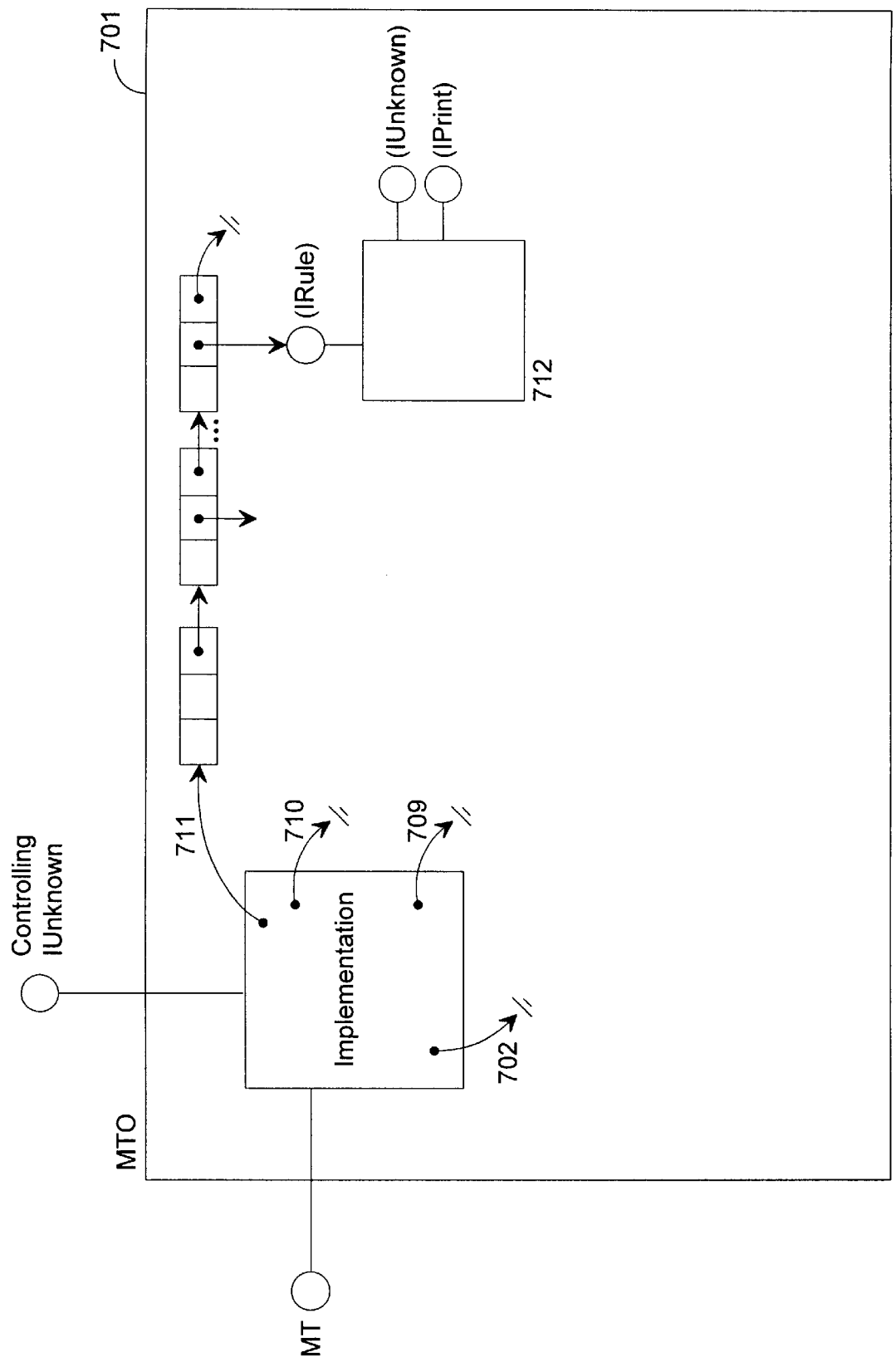
FIGS. 7A, 7B and 7C are block diagrams of the sequence of adding two objects to a multitype object.
Figure 7B:
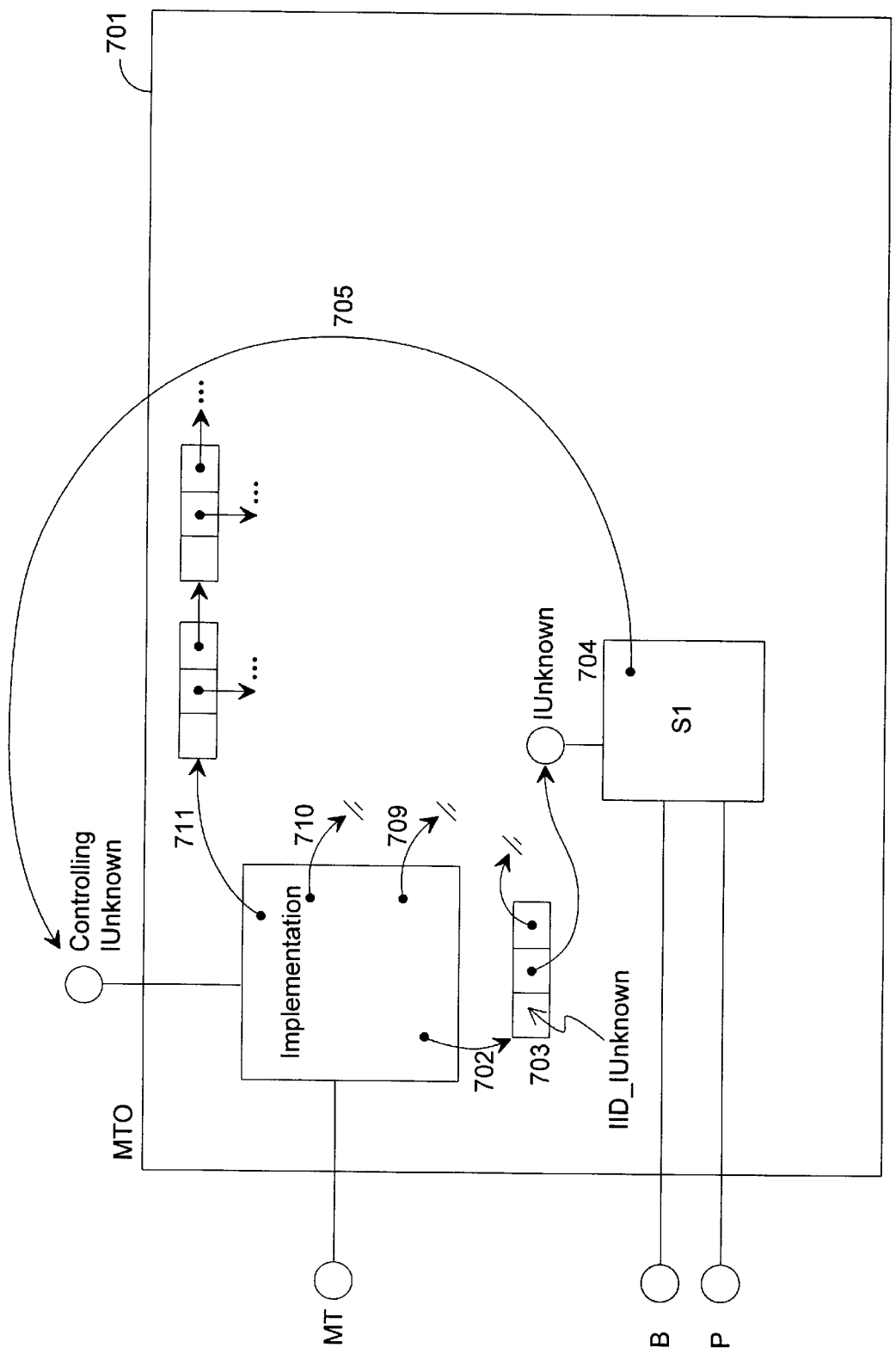
Figure 7C:
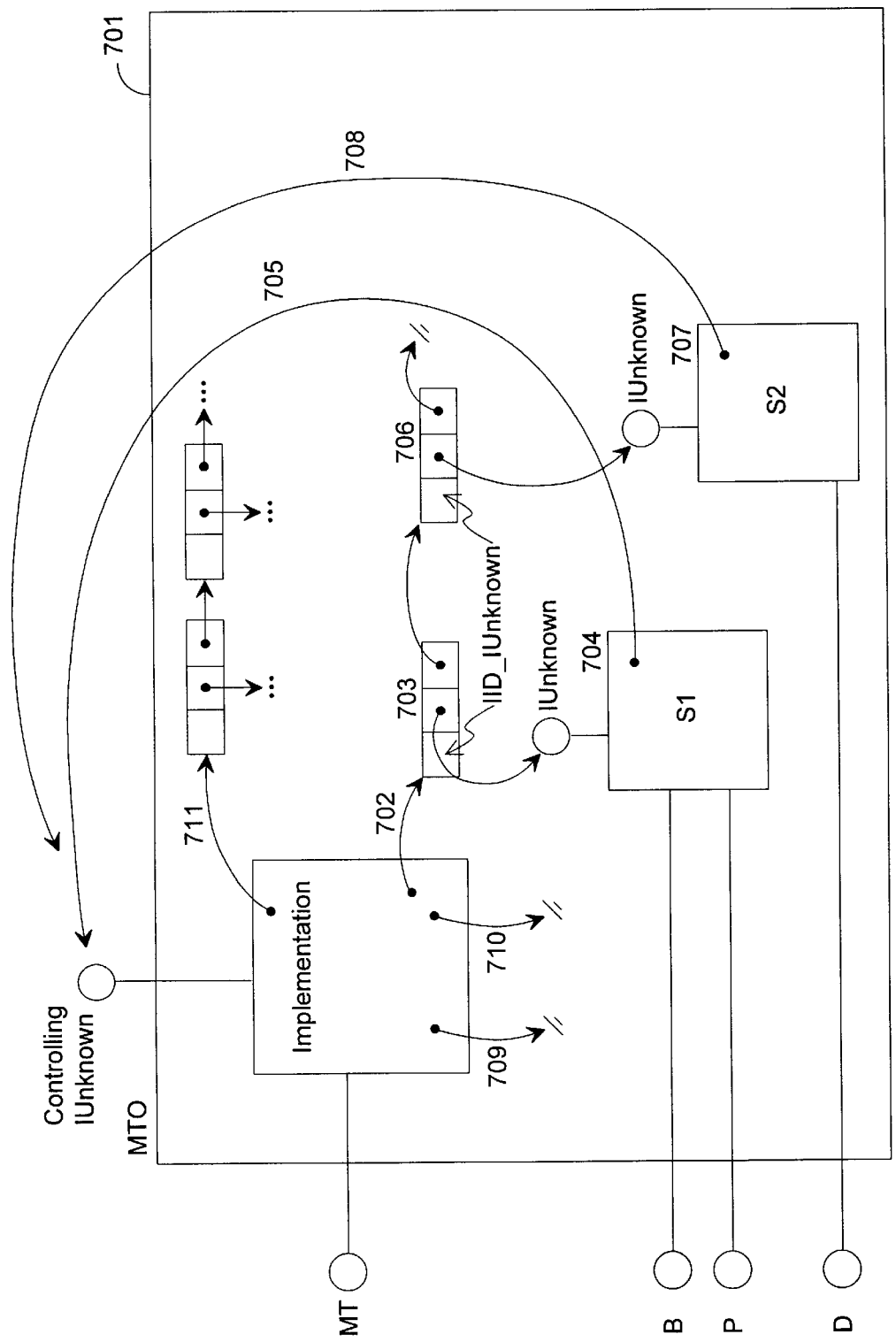

FIGS. 7A, 7B, and 7C are block diagrams of the sequence of adding two objects to a multitype object. FIG. 7A is a block diagram of an instance of a multitype object. The object MTO 7A01 implements an exposed interface, the IMultitype interface MT, and a controlling IUnknown. When an external interface is added to the multitype object, the multitype object becomes an aggregate object. The multitype object implementation contains three lists 7A02, 7A09, and 7A10 of interfaces it has added to the aggregation. The multitype object uses these lists to invoke the various interfaces of its enclosed aggregate objects through the multitype object's controlling IUnknown interface. The multitype object also contains a list of rules 7A11 for accessing and combining interfaces from the interface lists 7A02, 7A09, and 7A10.

The interaction of these different lists gives the multitype object powerful capabilities. The list of rules 7A11, which can be fixed or specified using the AddRule method, specifies the interaction and use of the different interface lists for a particular interface. Hence, there can be rules for selecting other rules as well as rules for selecting and combining particular interfaces. Th 7A09, and 7A10 are provided in order to support override, enhancement, default, and controlling capabilities. When an interface is added to the multitype object, the client program creating the aggregate specifies the list to be used in adding the interface. List 7A02 comprises the normal list, list 7A09 comprises the default list, and list 7A10 comprises the override list. Basically, the override list is intended implement override and controlling capabilities by pointing to interfaces that need to be accessed before the interfaces on the normal list. The default list is intended to point to interfaces that are accessed only when the override and normal lists do not contain a requested interface. The interaction of these lists is discussed in greater detail in the description of the IRules interface.

FIG. 7B is a block diagram illustrating the multitype object MTO after aggregating the IBasic interface using the AddObject method. The AddObject method adds all of the interfaces of a specified object to a multitype object. The aggregate object MTO 7B01 comprises the multitype interface discussed with reference to FIG. 7A and an enclosed spreadsheet object S17B04. The enclosed object S1 implements an instance of the external interface IBasic (B), an instance of the external interface IPrint (P), and an instance of IUnknown. (An external interface is an interface of an object that is exposed by an enclosing object. An internal interface is an interface of an object that is not exposed by an enclosing object.) When the enclosed object S1 is added to the normal list of the multitype object MTO, the normal list of aggregated interfaces 7B02 contains a single element 7B03, which identifies the IUnknown interface of the enclosed object S1. The S1 IUnknown interface returns pointers to the external interfaces B and P upon request. Because S1 is aggregatable, when S1 is instantiated, it is passed a pointer 7B05 to the enclosing object MTO, which can be used subsequently to access the other interfaces aggregated as part of object MTO.

FIG. 7C is a block diagram illustrating the multitype object MTO of the result after adding the IDatabase interface using the method AddObject. At this point, the aggregate object MTO 7C01 comprises the IMultitype interface, discussed with reference to FIG. 7A; an enclosed spreadsheet object S1, discussed with reference to FIG. 7B; and an enclosed database object S27C07, which implements database capabilities. The enclosed object S2 implements an instance of the external interface IDatabase (D) and an instance of IUnknown. When the enclosed object S2 is added to the multitype object MTO using the method AddObject of the IMultitype interface, the normal list of aggregated interfaces 7C02 contains two elements 7C03 and 7C06. Element 7C06 identifies the IUnknown interface of the enclosed object S2. Similar to S1, the S2 IUnknown interface is able to return a pointer to the external interface D and contains a pointer 7C08 to the enclosing object MTO for access to the other MTO interfaces.

One skilled in the art would recognize that many alternative embodiments of the data structures used to keep track of the added interfaces and objects are possible. For example, one could vary the number and kind of lists used. In particular, one could have only one list or make the override or default lists optional. Also, one could require that each list element only point to the precise interface to be aggregated and not the IUnknown of the object when an entire object is aggregated (only support an AddInterface style multitype object). Or, alternatively, one could require that each list element point to the IUnknown of the object regardless of what interface is added to the aggregation (only support an AddObject style multitype object). In addition, one could use other list implementations including various sorted lists or hash tables of interface identifiers.

Code Table 8

```
void CreateInstanceS1 (IUnknown *punkOuter, REFIID iid, void **ppv)
{   IUnknown *punk;
    S1::CreateInstance (punkOuter, &punk);
    punk->QueryInterface (iid, ppv);
    punk->Release ();
```

Code Table 8

```
} class IBasic: public IUnknown
{   virtual void File () = 0;
    virtual void Edit () = 0;
    virtual void Formula () = 0;
    virtual void Format () = 0;
    virtual void GetCell () = 0;
} class IPrint: public IUnknown
{   virtual void Print (void **ppobj) = 0;
} class S1: public IUnknown
{
public:
    static void CreateInstance(IUnknown *punkOuter, IUnknown
    **ppunk)
    {   S1 *pS1 new S1(punkOuter);
        pS1->QueryInterface(IID_IUnknown, ppunk);
    } private:
    void S1(IUnknown *punkOuter) : m_B(this), m_P(this)
    {   if (punkOuter == NULL)
                        m_punkOuter = this;
        else
                        m_punkOuter = punkOuter;
        m_refcount = 0;
    } class B: public IBasic
    {
    public:
        void B(S1 *pS1) {m_S1 = pS1;} virtual boolean QueryInterface (REFIID iid, void **ppv)
        { return m_pS1->m_punkOuter->QueryInterface(iid, ppv);} virtual void AddRef()
        { m_pS1->m_punkOuter->AddRef();} virtual void Release()
        { m_pS1->m_punkOuter->Release();}

// other methods of IBasic including File, Edit, Formula, Format,
        GetCell private:
        S1      *m_pS1;
    }
    friend B;
    B    m_B;

class P: public IPrint
    {
    public:
        void P(S1 *pS1) {m_pS1 = pS1;} virtual boolean QueryInterface (REFIID iid, void **ppv)
        { return m_pS1->_punkOuter->QueryInterface(iid, ppv);} virtual void AddRef()
        { m_pS1->m_punkOuter->AddRef();} virtual void Release()
        { m_pS1->m_punkOuter->Release();}

// other methods of IPrint including Print private:
        S1      *m_pS1;
    }
    friend P;
    P    m_P;

public:
```

Code Table 8

```
    virtual boolean QueryInterface (REFIID iid, void **ppv)
    {   ret = TRUE;
        switch (iid) {
        case IID_B:
                        *ppv = &m_B;
                        m_punkOuter->AddRef();
                        break;
        case IID_P:
                        *ppv = &m_P;
                        m_punkOuter->AddRef();
                        break;
        case IID_IUnknown:
                        *ppv = this;
                        AddRef();
                        break;
        default:
                        ret = FALSE;
        }
        return ret;
    } virtual void AddRef(){ m_refcount++;} virtual void Release() {if(--m_refcount == 0) delete this;} private:
    IUnknown        *m_punkOuter;
    int             m_refcount;
}
```

Code Table 8 contains C++ pseudocode for a preferred class definition of the object S1 in FIGS. 7A–7C, which can be enclosed in an aggregate (an aggregatable object) along with a global function that creates an instance of the S1 object. The classes IUnknown, IBasic, and IPrint are interfaces that define the methods of each interface comprising S1. The class S1 implements the IUnknown interface, the IBasic interface, and the IPrint interface. The IBasic and IPrint interfaces are implemented as external interfaces.

Figure 8:
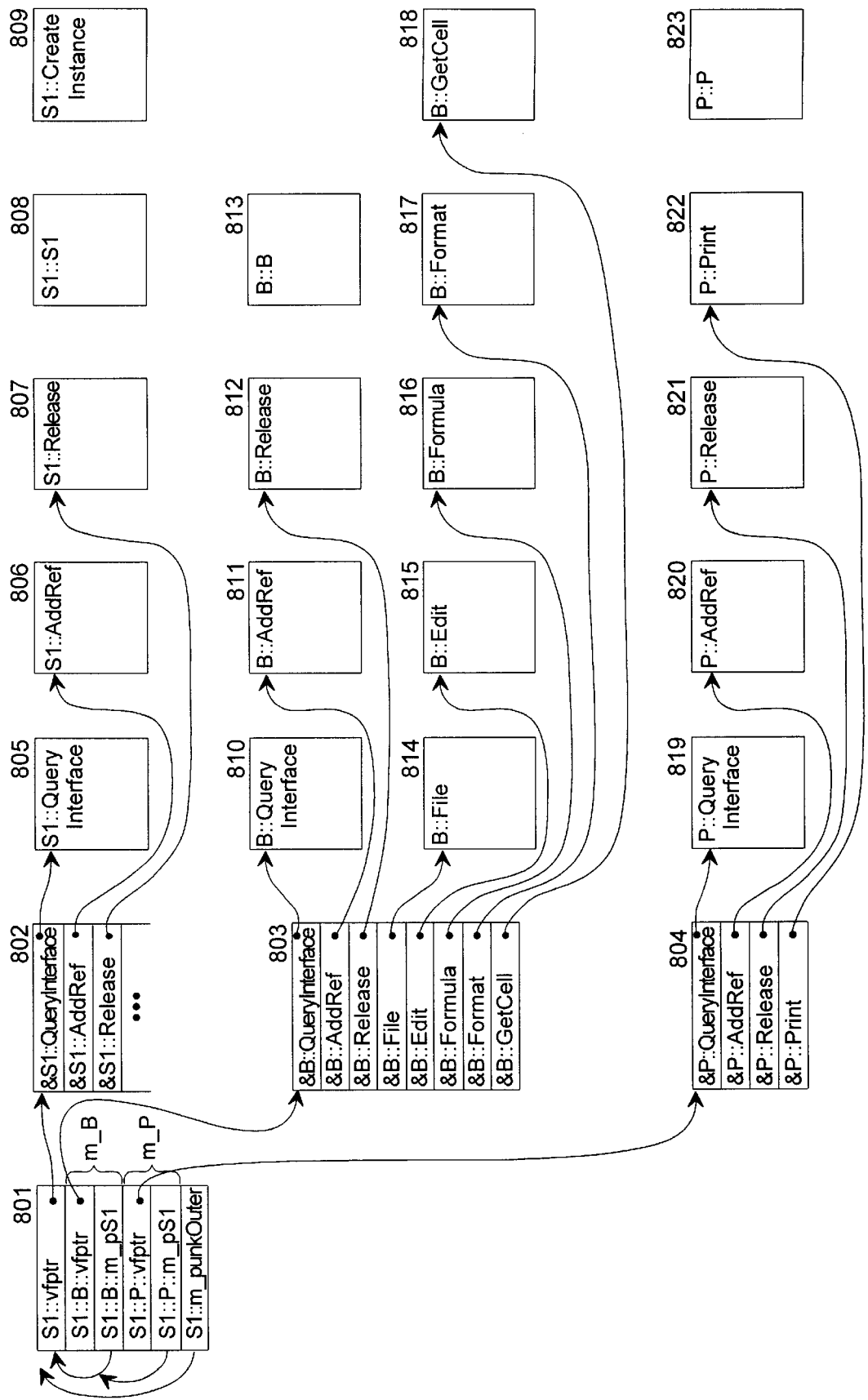
FIG 8 is a block diagram of the data structure layout of an instance of an object of class S1.

FIG. 8 is a block diagram of the data structure layout of an instance of an object of class S1. Instance structure 801 contains the data members of class S1 (m_B, m_P, m_punkOuter) and the virtual function table pointer (S1::vfptr). The data members m_B and m_P are instances of objects of classes B and P, respectively (which are class implementations of the interfaces IBasic and IPrint). Data members m_B and m_P are friends of class S1, which allows m_B and m_P objects to access the private members of class S1, such as m_punkOuter. The virtual function table pointer S1::vfptr points to virtual function table 802, the virtual function table pointer within data member m_B, S1::B::vfptr, points to virtual function table 803, and the virtual function table pointer within data member m_P, S1::P::vfptr, points to virtual function table 804. Virtual function table 802 contains pointers to the virtual functions (methods) defined for the controlling IUnknown interface, virtual function table 803 contains pointers to the virtual functions defined for the IBasic interface, and virtual function table 804 contains pointers to the virtual functions defined for the IPrint interface. Methods 805 through 809 are the function members of class S1. Method 808 is the constructor for class S 1. Method 809 is the CreateInstance method for class S1. Methods 810 through 818 are the function members of class B. Method 813 is the constructor for class B. Methods 819 through 823 are the function members of class P. Method 823 is the constructor for class P. Because FIG. 8 shows an instance of an S1 object that is not part of an aggregate, the data members S1::B::m_pS1, S1::P::m_pS1, and S1::m_punkOuter (pointers to the enclosing object) are initialized to point to the S1 object itself.

The object S1 as defined by Code Table 8 conforms to the requirements for an aggregatable object discussed with reference to static aggregation. For the purposes of dynamic aggregation, Code Table 8 illustrates how S1 can automatically communicate with its enclosing object when it is aggregated and what is returned from the function S1::QueryInterface. Specifically, upon creation of an S1 object, a pointer to the controlling IUnknown interface of an enclosing multitype object is passed to the method CreateInstance. This pointer is then used by the QueryInterface methods of S1's external interfaces (IBasic and IPrint) to route interface requests to the enclosing multitype object. When an S1 interface is requested from the enclosing multitype object, the method QueryInterface of the controlling IUnknown of the enclosing multitype object invokes the method S1::QueryInterface, which returns a pointer to the appropriate instance of the interface IBasic, the interface IPrint, or the interface IUnknown and increments the S1 object's reference counting appropriately. (The mechanism used by the enclosing multitype object to invoke S1::QueryInterface is discussed in detail below.)

One skilled in the art would recognize that many alternatives exist for passing to an aggregatable object a pointer to the controlling IUnknown interface of an enclosing multitype object. For example, instead of passing the pointer at creation time, a method can be defined specifically for passing this pointer. Using this embodiment, an object can, once aggregated, be later unaggregated, or an object could later be aggregated into a different enclosing object.

To understand how Code Table 8 interacts with a multitype object as depicted in FIGS. 7A–7C, it is helpful to see the calling sequence when client requests are made. Code Table 9 shows the pseudocode sequence of calls corresponding to FIG. 7C when a client application requests the IBasic interface when the client has a pointer to the multitype object MTO.

---
Code Table 9
---

MTO:: QueryInterface (IID__IBasic, ppv)
which finds an aggregated object that supports the IBasic interface
    S1:: IUnknown:: QueryInterface (IID__IBasic, ppv)
        which returns pointer to the B interface

---

In the first call (MTO::QueryInterface), MTO determines from its lists of aggregated interfaces which object's QueryInterface method to invoke and then invokes it in the second call (S1::IUnknown::QueryInterface).

Code Table 10 shows how the pseudocode sequence of calls varies if the client application has a pointer to one of the enclosed object's interfaces (such as the IPrint interface of S1) instead of a pointer to the enclosing multitype object.

---
Code Table 10
---

P::QueryInterface (IID__IBasic, ppv)
which forwards the call to the enclosing object
    MTO:: IUnknown:: QueryInterface (IID__IBasic, ppv)
    // m__punkOuter points to MTO:: IUnknown
    which finds an aggregated object that supports the IBasic interface
        S1:: IUnknown:: QueryInterface (IID__IBasic, ppv)
            which returns pointer to the B interface

---

Code Table 10 demonstrates how aggregation will automatically forward requests to the enclosing object in order to access other interfaces within the aggregate. In this case, the QueryInterface function of the enclosed object forwards the request to the enclosing object's (MTO's) QueryInterface method. Then, the MTO::QueryInterface method functions as in Code Table 9.

The S2 object that implements the. IDatabase interface is analogous to the S1 object as described above.

---
Code Table 11
---

```
void CreateInstanceMTO (IUnknown *punkOuter, REFIID iid,
void **ppv)
{   IUnknown *punk;
    MTO::CreateInstance (punkOuter, &punk);
    punk->Query Interface (iid, ppv);
    punk->Release ();
} class IMultitype: public IUnknown
{   virtual HRESULT AddObject (ULONG list, BOOLEAN
                headoflist, IUnknown *punkobj) = 0;
    virtual HRESULT AddInterface (REFIID iid, ULONG list,
                BOOLEAN headoflist, void *pv) = 0;
    virtual HRESULT AddRule (REFIID iid, IRule
                *prule) = 0;
                virtual HRESULT Enum (ULONG i, REFIID iid,
                list, ULONG BOOLEAN headoflist,
                void **ppv) = 0;
} class MTO: public IUnknown
{
public:
    static void CreateInstance(IUnknown *punkOuter, IUnknown
    **ppunk)
    {   MTO *pMTO = new MTO(punkOuter);
        pMTO->QueryInterface(IID__IUnknown, ppunk);} private:
    void MTO(IUnknown *punkOuter): m__MT(this)
    {   if (punkOuter == NULL)
                m__punkOuter = this;
        else
                m__punkOuter = punkOuter;} class MT: public IMultitype
    {
    public:
        void MT(MTO *pMTO) {m__pMTO = pMTO}
        virtual boolean QueryInterface (REFIID iid, void **ppv)
        { return m__pMTO->m__punkOuter->QueryInterface(iid,
        ppv);} virtual void AddRef()
        { m__pMTO->m__punkOuter->AddRef();} virtual void Release()
        { m__pMTO->m__punkOuter->Release();}
        virtual boolean AddObject (ULONG list, BOOLEAN headoflist,
                    IUnknown *punkobj)
        {   item *pitem;
            pitem = new (item);
            pitem->iid = IID__Unknown;
            pitem->pobj = punkobj;
            pitem->pnext = null;
            pitem->pprev = null;
            switch (list) {
            case NORMAL__LIST:
                // . . . if headoflist == true, insert as first item in
                    normal list,
                // otherwise insert as last item;
            case DEFAULT__LIST:
                // . . . if headoflist == true, insert as first item in
                    default list,
                // otherwise insert as last item;
            case OVERRIDE__LIST:
                // . . . if headoflist == true, insert as first item in
                    override list,
                // otherwise insert as last item;
            default:
                // . . . insert at head of normal list;
            }
        }
```

Code Table 11

```
        virtual boolean AddInterface (REFIID iid, ULONG list,
                     BOOLEAN headoflist, void *pv)
        {   . . .
            pitem->iid = iid;
            pitem->pobj = pv;
            // same code as for AddObject method except that list item
            points to
            // the particular interface and not to the IUnknown interface
            . . .
        }

\\ other methods of IMultitype . . .

private:
        MTO      *m_pMTO;
    }
    friend MT;
    MT       m_MT;

public:
        virtual boolean QueryInterface(REFIID iid, void **ppv)
        {   boolean done = TRUE;
            item *pitem;

switch (iid) {
            case IID_IMultiType:
                *ppv = &m_MT;
                m_punkOuter->AddRef();
                break;
            case IID_IUnknown:
                *ppv = this;
                AddRef();
                break;
            default:
                // search through the override list for the first matching
                interface
                done = FALSE;
                pitem = m_poverride_itemhead;
                while ((done == FALSE) && (pitem->pnext != null)) {
                    switch (pitem->iid) {
                    case IID_IUnknown:
                        if (pitem->pobj->QueryInterface(iid,
                            ppv) == TRUE)
                            done = TRUE;
                        else pitem = pitem->pnext;
                        break;
                    default:
                        if (pitem->iid == iid) {
                            ppv = pitem->pobj;
                            done = TRUE;
                        }
                        else pitem = pitem->pnext;
                }}
                // search through the normal list for the first matching
                interface
                // if not yet found
                if (done == FALSE) {
                    pitem = m_pnormail_itemhead;
                    while ((done == FALSE) &&
                    pitem->pnext != null)) {
                             . . . // same code as for override list
                }
                // search through the default list for the first matching
                interface
                // if not yet found
                if (done == FALSE) {
                    pitem = m_pdefault_itemhead;
                    while ((done == FALSE) &&
                    (pitem->pnext != null)) {
                             . . . // same code as for override list
                }
                break;
        }
        return done;
    } virtual void AddRef() { m_refcount++;}
```

Code Table 11

```
    virtual void Release() {if(--m_refcount == 0) delete this;}
private:
    IUnknown         *m_punkOuter;
    int              m_refcount, m_occurrence;

struct item {
        REFIID iid;
        void         *pobj;
        item         *pnext;
        item         *pprev };
    item      *m_pnormal_itemhead = null,
              *m_pnormal_itemtail = null,
              *m_pdefault_itemhead = null,
              *m_pdefault_itemtail = null,
              *m_poverride_itemhead = null,
              *m_poverride_itemtail = null;
};
```

Code Table 11 is C++ pseudocode for a preferred class definition of a multitype object which can be used to dynamically aggregate interfaces. The class MTO implements an instance of the IMultitype interface and the controlling IUnknown interface for the multitype object.

The global function CreateInstanceMTO creates an instance of an object of class MTO. A client invokes this function to instantiate an object of class MTO. Using this function, a client can instantiate an object of class MTO without having access to the MTO class definition at compile time or run time. The function CreateInstanceMTO is passed a pointer to the controlling IUnknown interface (punkOuter) when the instantiated MTO object is aggregated within another object. The function invokes the method MTO::CreateInstance passing along the parameter punkOuter.

The method MTO::CreateInstance instantiates an MTO object and returns a pointer (ppunk) to the IUnknown interface of the MTO object. This interface can then be used by the function CreateInstanceMTO to return the interface actually requested by the client application. The method MTO::CreateInstance uses the operator new to instantiate the MTO object. During instantiation, the constructor MTO::MTO is invoked and passed the value of the parameter punkOuter.

The constructor MTO::MTO initializes the data members m_MT and m_punkOuter. During instantiation of the data member m_MT of class MT, the constructor MT::MT is invoked and passed the this pointer for the MTO object. (In C++, the this pointer points to the object instance itself.) The constructor MT::MT then sets a local variable pointing back to the MTO class. The constructor MTO::MTO is passed the parameter punkOuter. If the value of punkOuter is null, the constructor MTO::MTO sets the data member m_punkOuter to point to the newly instantiated MTO object. If, on the other hand, punkOuter is non-null, for example, if the object is aggregated as part of a larger aggregation, the constructor MTO::MTO sets the data member m_punkOuter to the value of the parameter punkOuter. That is, data member m_punkOuter points to the value of the controlling IUnknown interface of the aggregate when the MTO object is enclosed and points to the IUnknown interface of the MTO object when the MTO object is not enclosed.

The IMultitype interface implemented by the MTO object contains four methods AddObject, AddInterface, AddRule, and Enum. The method AddObject is responsible for adding an object to be enclosed within the multitype object (all of the object's interfaces are made accessible). It is discussed with reference to FIG. 9. The method AddInterface is responsible for adding a single interface instance to the multitype object. The method AddInterface is discussed in conjunction with the method AddObject. The method AddRule enables a client application to specify a combining rule used to determine which combination of objects to query or interfaces to return when a client application requests a particular interface identifier. It is discussed in detail in conjunction with rule objects. The method Enum is used by rule objects to enumerate over the various interface lists maintained by the multitype object. This method is discussed in detail in conjunction with rule objects.

Figure 9:
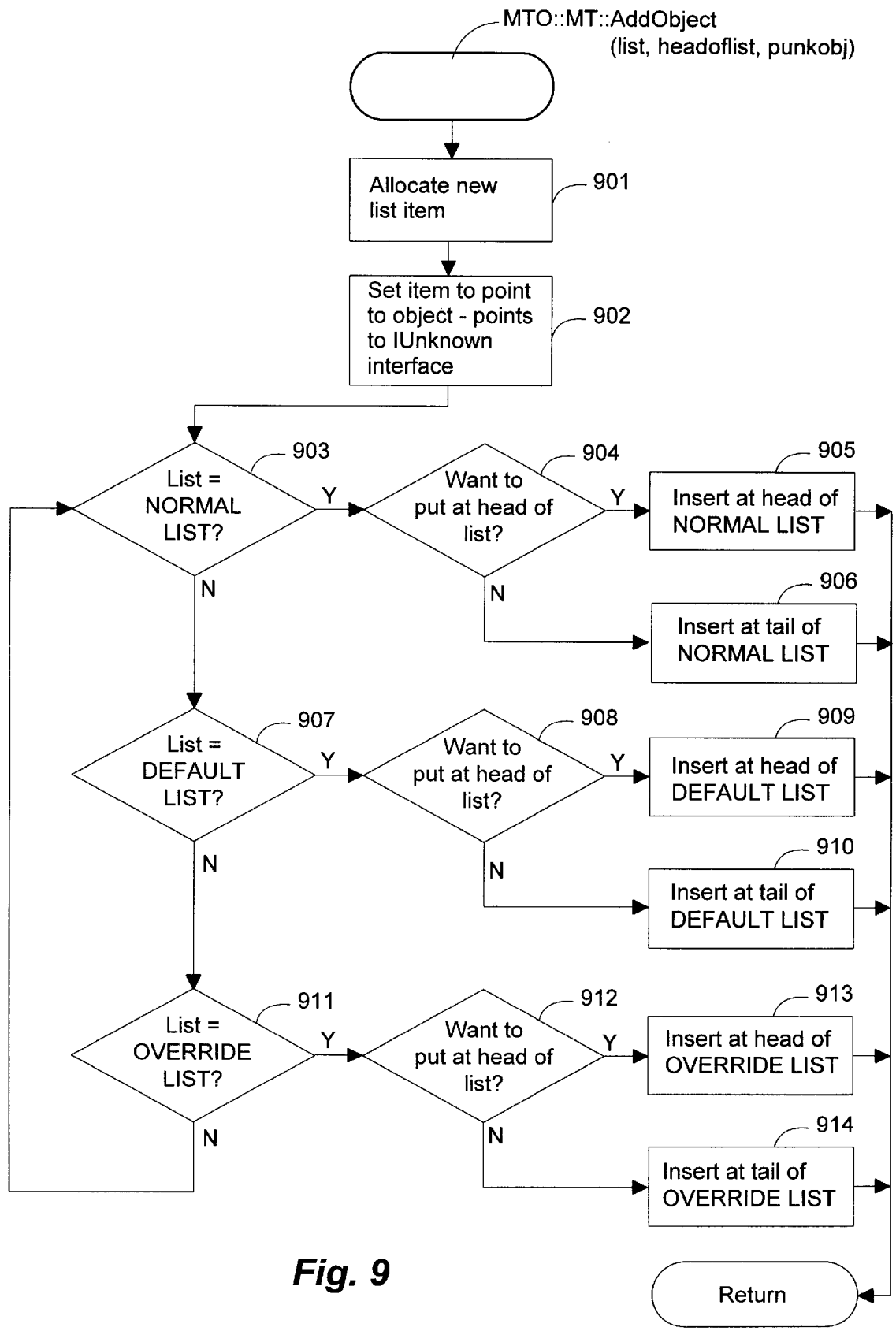
FIG. 9 is a flow diagram of the method AddInterface of the IMultitype interface implemented by a multitype object.

FIG. 9 is a flow diagram of the method AddObject of the IMultitype interface implemented by a multitype object. FIG. 9 corresponds to the code for AddObject shown in Code Table 11. The method AddObject is used by a client application to dynamically add to a multitype object access to all of the interfaces of an object. This method is passed a list indicator indicating to which list to add the object, an indication of whether the object should be added to the head or tail of the specified list, and a pointer to the IUnknown interface of the object to aggregate. This method, along with the method AddInterface, implements structures for maintaining information regarding the objects and interfaces enclosed by a multitype object.

One typical implementation uses three list structures composed of elements each pointing to an interface of an enclosed object. When the method AddObject is invoked to enclose the entire object, a new element is added to the specified list structure; the new element points to the IUnknown interface of the enclosed object. This IUnknown interface can then be used to access the component interfaces of the enclosed object. If, on the other hand, the method AddInterface is invoked to enclose a single interface of an object, then a new list element is added to the specified list structure; the new element points to the single interface to allow direct access to it. In a typical implementation, each list element is indexed by an interface identifier, points to an interface of an enclosed object, and points to the next element in the list. Since clients can add to either the head or tail of a list, a doubly linked list can be used to increase the efficiency.

In the method invocation, a client application specifies on which list the application wants to add the specified interface or object. A "normal" list is used when the client application wants to simply add interfaces or objects to the aggregation. An "override" list and a "default" list are used when the client application wants to add interfaces whose methods will be invoked at a different time than those on the normal list. In a typical implementation, upon request for a particular interface, the method QueryInterface of the controlling IUnknown of the multitype object will return the requested interface searching first through the override list, second through the normal list and third through the default list. One skilled in the art would recognize that many other implementations and search strategies are possibly including varying the number of list structures, changing the search order, and changing the determination of what constitutes matching a requested interface. In a preferred embodiment, as discussed in detail below, the client application may change the determination rules.

The steps of FIG. 9 illustrate how an element is added to the specified list. In step 901, the method allocates a new list item and, in step 902, initializes the item to point to the IUnknown interface of the object containing the interfaces the client application desires to aggregate and to contain the interface identifier of the item (to indicate the IUnknown interface). In step 903, the method determines whether the normal list has been specified. If so, the method continues at step 904, else it continues at step 907. In step 904, the method determines whether the client application wants to insert an element at the head of the normal list. If so, the method continues at step 905,else it continues at step 906. In step 905, the method inserts the initialized element at the head of the normal list and returns. In step 906, the method inserts the initialized element at the tail of the normal list and returns. Steps 907 through 914 operate analogously on the override and default lists.

The method AddInterface of the IMultitype interface works similarly to the method AddObject. The primary difference is that, instead of an added list element pointing to the specified IUnknown interface of the object to be enclosed, the added list element points to a specified interface and indicates the passed interface identifier. In this manner, a single interface of an object can be aggregated without exposing other interfaces.

Returning to Code Table 11, the methods QueryInterface, AddRef, and Release of the IMultitype interface (the inherited IUnknown interface) forward requests to the IUnknown interface of the parent object that implements this IMultitype interface (MTO).

The controlling IUnknown interface implemented by the MTO object contains the methods QueryInterface, AddRef, and Release. The methods AddRef and Release implement reference counting of the multitype object. When the reference count is zero, the MTO object is deleted.

Figure 10:
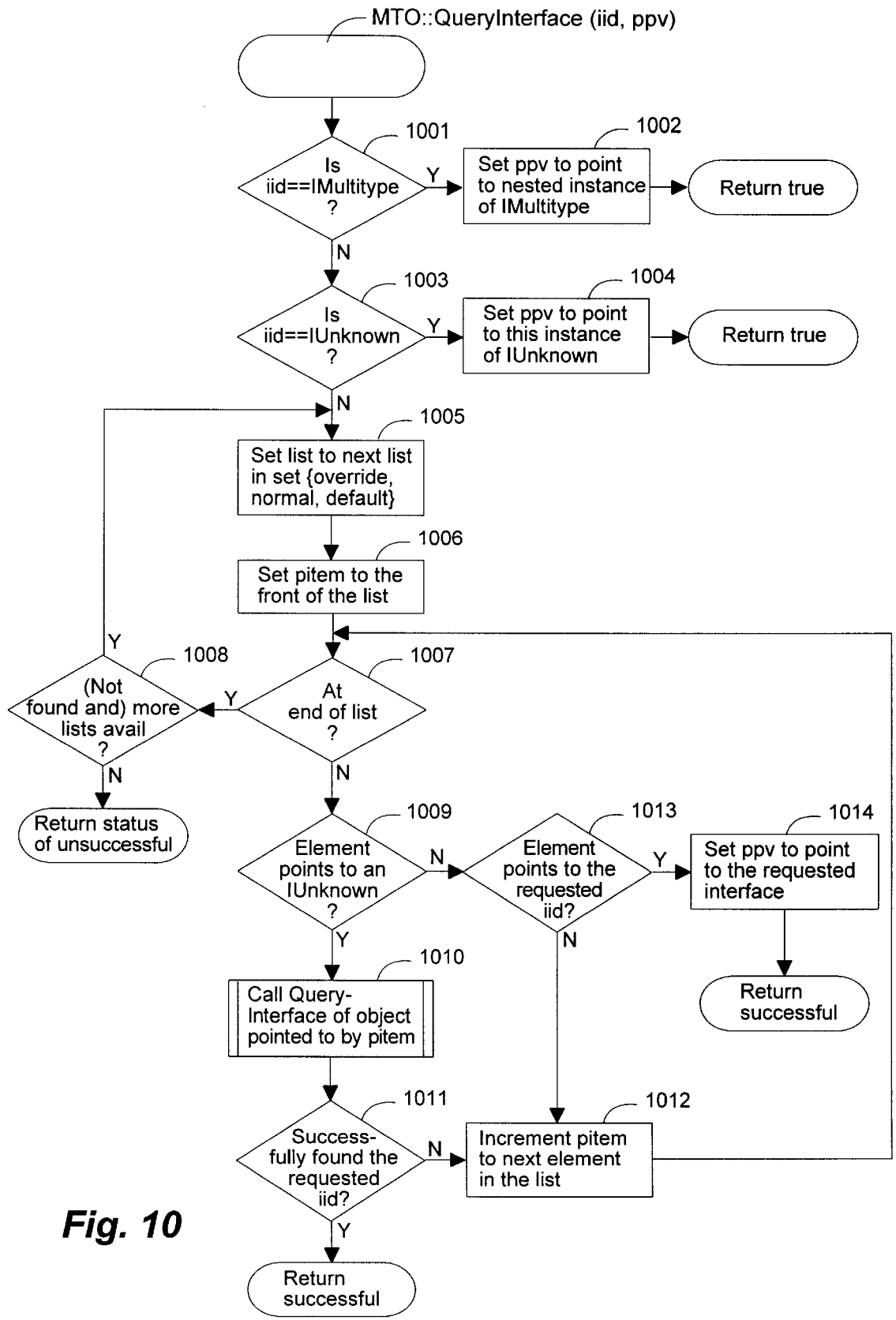
FIG. 10 is a flow diagram of the method QueryInterface of the controlling IUnknown interface for a multitype object.

FIG. 10 is a flow diagram of the method QueryInterface of the controlling IUnknown interface for a multitype object. FIG. 10 corresponds to the code for QueryInterface shown in Code Table 11. The method QueryInterface locates a requested interface using knowledge of its own implementation and information from the aggregated interface lists. The method takes an input parameter which is the requested interface identifier and outputs a pointer to the requested interface. In steps 1001–1004, the method determines whether the requested interface is one implemented by the multitype object itself. Otherwise, in steps 1005–1014, the method searches each enclosed object or interface until it finds the requested interface.

In step 1001, the method determines whether the requested interface identifier is equivalent to IID__IMultitype, and if it is, continues at step 1002, else continues at step 1003. In step 1002, the method sets the output parameter to point to the instance of IMultitype implemented by the object MTO, and returns. In step 1003, the method determines whether the requested interface identifier is equivalent to IID__IUnknown and, if it is, continues at step 1004, else it continues at step 1005. In step 1004, the method sets the output parameter to the this pointer, which is the instance of IUnknown implemented by the multitype object, and returns.

In steps 1005 through 1014, the method loops over the three lists searching for the first list element that points to an interface matching the requested interface. When this interface is found, it is returned in the parameter ppv and the method returns a successful status. One skilled in the art would recognize that this implementation is one example of many types of searches that can be used. In step 1005, a temporary list indicator is set to the next list from the set of lists implemented by a multitype object. In a preferred embodiment, this set of lists includes an override, a normal, and a default list. In step 1006, the method sets a temporary variable pitem to point to the front of the current list. In step 1007, the method determines whether it has exhausted all of the elements in the current list and has still not found a matching interface. If the method has reached the end of the current list, then the method continues at step 1008, else it continues at step 1009. In step 1008, if the method determines that more lists are available to be searched, then the method continues back at step 1005 to begin searching a new list. Otherwise, the method returns an unsuccessful status since no matching interface was found. In step 1009, the method determines whether the current list element, pointed to by the temporary variable pitem, points to an IUnknown interface, and if it does continues at step 1010, else it continues at step 1013. (If the current list element points to an IUnknown interface, then the object corresponding to this interface needs to be further queried for a matching interface.) In step 1010, the method calls the method QueryInterface of the IUnknown interface pointed to by the current list element. In step 1011, the method determines whether the requested interface identifier was found and, if not, continues at step 1012, else returns. If the requested interface identifier was found, then the QueryInterface call would have already set the return parameter ppv to point to the requested interface. In that case, the method returns a successful status. Otherwise, in step 1012, the method increments the current list element pointer (pitem) to point to the next element in the list and continues at step 1007 to search through the current list structure. In step 1013, the method compares the requested interface identifier with the interface identification field of the current list element and, if they are the same, continues at step 1014, else continues at step 1012 with the search. In step 1014, the method sets the return parameter ppv to point to the requested interface (pointed to by the current list element) and returns a successful status.

Figure 11:
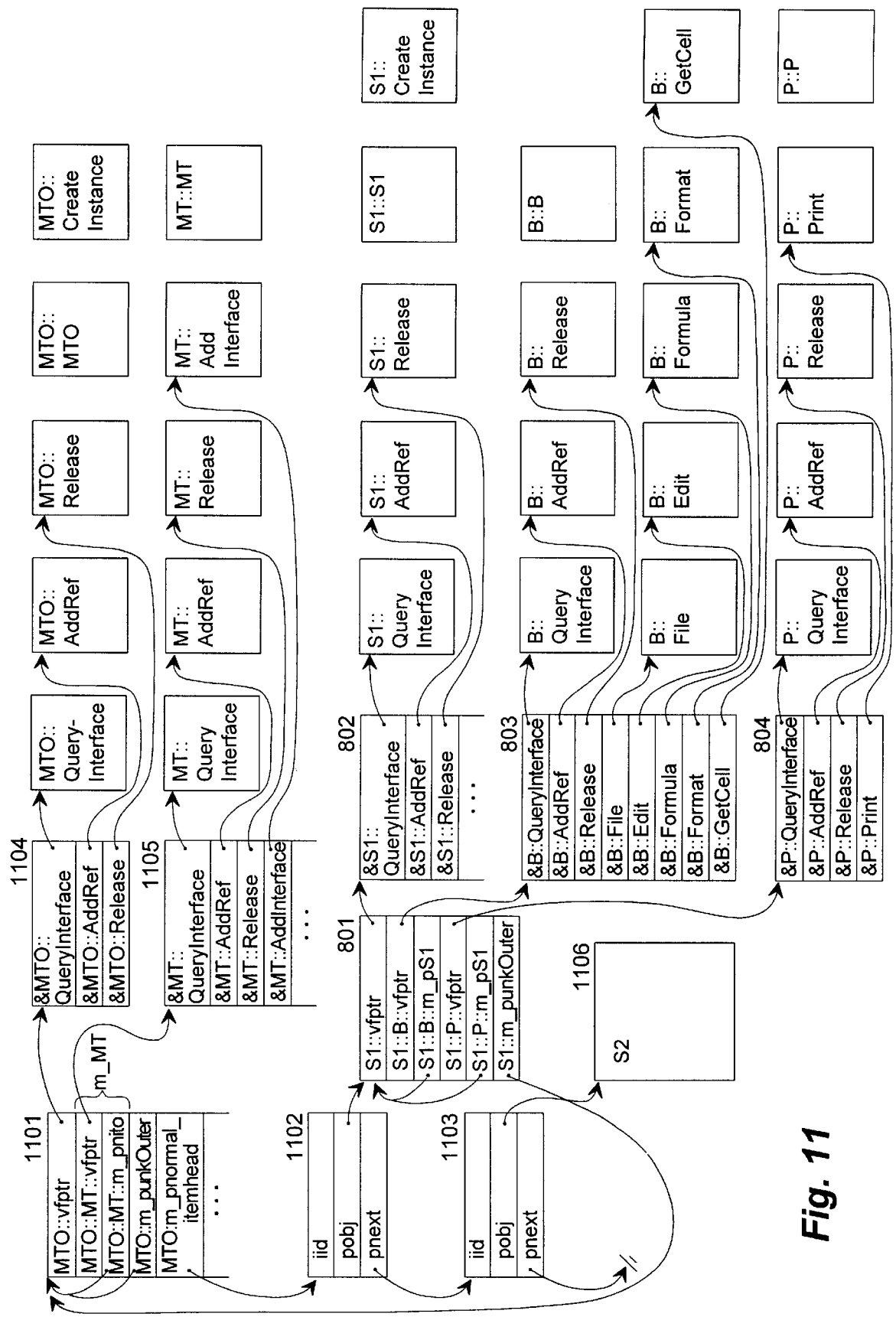
FIG. 11 is a block diagram showing the data structure layout of a multitype object, corresponding to FIG. 7C, after the IBasic, IPrint, and IDatabase interfaces have been dynamically aggregated using the method AddObject.

FIG. 11 is a block diagram showing the data structure layout of a multitype object, corresponding to FIG. 7C, after the IBasic, IPrint, and IDatabase interfaces have been dynamically aggregated using the method AddObject. The data structure layout comprises instance data 1101, virtual function tables 1104 and 1105, methods 1107 through 1115, and instances of currently enclosed (aggregated objects). The instance data 1101 contains a pointer to the virtual function table for the controlling IUnknown interface, data member m_MT which is an instance of class MT (an implementation of the IMultitype interface), data member m_punkOuter which points to the IUnknown interface of the MTO object, and data member m_pnormal_itemhead which points to the head of the normal list of currently added interfaces. As depicted, the list currently contains two elements. List element 1102 points to an instance of an S1 object 801–823 (as defined in FIG. 8) and list element 1103 points to an instance of an S2 object 1106. Although not shown, the multiple object also contains pointers to a default list and an override list, which are empty.

When the enclosed S1 object is instantiated, its data member S1::m_punkOuter is initialized to point to the IUnknown interface of the MTO object. Similarly, when the enclosed S2 object is instantiated, its data member S2::m_punkOuter is initialized to point to the IUnknown interface of the MTO object. This task is accomplished, as previously discussed, by passing a pointer to MTO in the CreateInstanceXX function (where XX is S1 or S2).

Code Table 12

```
MTO     *pMTO;
IMultiType *my_pMT;
IUnknown *pSpreadSheet, *pDataBase;
CreateInstanceMTO (NULL, IID_IUnknown, pMTO);
CreateInstanceS1 (pMTO, IID_IUnknown, pSpreadSheet);
CreateInstanceS2 (pMTO, IID_IUnknown, pDataBase);
pMTO->QueryInterface (IID_Multitype, my_pMT);
my_pMT->AddObject (IID_ISpreadSheet, NORMAL_LIST, true,
    pSpreadSheet)
my_pMT->AddObject (IID_IDataBase, NORMAL_LIST, true,
    pDataBase);
...
// Some later time, some other client can invoke the database capability
    of a spreadsheet object
pSpreadSheet -> QueryInterface(IID_IDataBase, ppv);
ppv->Data();
```

Code Table 12 contains pseudocode for the preferred list of steps for dynamically aggregating a set of interfaces. This example corresponds to adding the interfaces for IBasic, IPrint, and IDatabase as shown in FIG. 7C using the method AddObject to add all of the interfaces of an object. First, a new multitype object is allocated using the function CreateInstanceMTO. Using this function, the IUnknown interface is retrieved for the newly instantiated multitype object. This interface is passed to the S1 and S2 objects when they are instantiated to allow them to access the enclosing multitype object. At some point, an instance of the S1 object is created, passing it the pointer to the multitype object. Also, an instance of the S2 database object is created, passing it a pointer to the multitype object. After these instances of S1 and S2 have been created, the IMultitype interface is retrieved from the multitype object. This interface will be used to dynamically add the spreadsheet and database interfaces to the multitype object. Next, the method AddObject of the IMultitype interface of the multitype object is invoked to aggregate the S1 and S2 objects into the multitype object. Once these objects have been enclosed in the multitype object, a client can use any interface of the multitype object or any of its enclosed objects to access any other interface within the aggregate object. Code Table 12 shows an example of retrieving the database interface using the basic spreadsheet object (S1) and then invoking the data method of this IDatabase interface.

Code Table 13

```
class IMultitype: public IUnknown
{   virtual HRESULT AddObject (ULONG list, BOOLEAN headoflist,
            IUnknown *punkobj) = 0;
    virtual HRESULT AddInterface (REFIID iid, ULONG list,
            BOOLEAN headoflist, void *pv) = 0;
    virtual HRESULT AddRule (REFIID iid, IRule *prule) = 0;
    virtual HRESULT Enum (ULONG i, REFIID iid, ULONG list,
            BOOLEAN headoflist, void **ppv) = 0;
} class IRule: public IUnknown
{   virtual HRESULT Init (IMultitype *pMTO) = 0;
} class MTO: public IUnknown
{
public:
    static void CreateInstance(IUnknown *punkOuter, IUnknown
        **ppunk)
        {   MTO *pMTO = new MTO(punkOuter);
            pMTO->QueryInterface(IID_IUnknown, ppunk);}
```

Code Table 13

```
private:
    void MTO(IUnknown *punkOuter) : m_MT(this)
        {   if (punkOuter == NULL)
                m_punkOuter = this;
            else
                m_punkOuter = punkOuter;
            pQI = new(MyQI);   // make a QueryInterface default rule
            pQI->QueryInterface(IID_IRule, prule);
            m_MT->AddRule(IID_IUnknown, prule);
        } class MT: public IMultitype
{
public:
    void MT(MTO *pMTO) {m_MTO = pMTO} virtual HRESULT QueryInterface (REFIID iid, void **ppv)
    { return m_pMTO->m_punkOuter->QueryInterface(iid,
    ppv);} virtual void AddRef()
    { m_pMTO->m_punkOuter->AddRef();} virtual void Release()
    { m_pMTO->m_punkOuter->Release();} virtual HRESULT AddObject (ULONG list, BOOLEAN
        headoflist, IUnknown *punkobj)
    {   item *pitem;
        pitem = new (item);
        pitem->iid = IID_IUnknown;
        pitem->pobj = punkobj;
        pitem->pnext = null
        pitem->pprev = null;
        switch (list) {
            case NORMAL_LIST:
                // . . . if headoflist == true, insert as first item in
                    normal list,
                // otherwise insert as last item;
            case DEFAULT_LIST:
                // . . . if headoflist == true, insert as first item in
                    default list,
                // otherwise insert as last item;
            case OVERRIDE_LIST:
                // . . . ifheadoflist == true, insert as first item in
                    override list,
                // otherwise insert as last item;
            default:
                // . . . insert at head of normal list;
        }
    }
    virtual HRESULT AddInterface (REFIID iid, ULONG list,
    BOOLEAN headoflist,
        void *pv)
    {   . . .
        pitem->iid = iid;
        pitem->pobj = pv;
        // same code as for AddObject method except that list
        item points to
        // the particular interface and not to the IUnknown
        interface
        . . .
    } virtual HRESULT AddRule (REFIID iid, IRule *prule)
    // this method adds a rule object to the list of rules in
    the multitype object
    {   ruleitem *pruleitem;

pruleitem = new(ruleitem);
        pruleitem->iid = iid;
        pruleitem->prule = prule;
        pruleitem->pnext = null;
        pruleitem->pprev = null;
        // insert in the rule list -- one way to do this is to insert
        the rule as last item
        // so QueryInterface is always first
        . . .
        prule->Init(m_pMTO);   // tell the rule about the
        multitype object
    }
    virtual HRESULT Enum (ULONG i, REFIID iid, ULONG list,
        BOOLEAN headoflist, void**ppv)
    // this method returns the i'th occurrence of the element
    corresponding to the
    // specified iid in the specified list beginning with the head or
    tail of the list
    {   int counter = 0;
        item *pitem = null;
        ruleitem *pruleitem = null;
        boolean done = FALSE;
        switch (list) {
            case NORMAL_LIST:
                if (headoflist) {
                    pitem = m_pMTO->m_normal_itemhead;
                    while ((!done) && (pitem ! = null)) {
                        // for each item in the list, compare
                        either the pobj field if the
                        // item points to an interface that has
                        been added or query
                        // interface the object to see if the interface
                        exists if the entire
                        // object has been added
                        switch (pitem->iid {
                            case IID_IUnknown:
                                if ((pitem->pobj->Query-
                                Interface(iid, ppv) = = TRUE)
                                    (counter = = i))
                                    done = TRUE;
                                else pitem=pitem->pnext;
                                break;
                            default:
                                if((pitem->iid = = iid) &&
                                (counter = = i)) {
                                    done = TRUE;
                                    ppv = pitem->pobj;
                                } else pitem = pitem-> pnext;
                                break;
                        }};
                else {      . . . // start from tail and work
                            backwards using
                            // pitem = pitem->pprev;
                }
                break;
            case DEFAULT_LIST:
                // works the same as the normal list except uses
                the default list break;
            case OVERRIDE_LIST:
                // works the same as the normal list except uses the
                override list break;
            case RULE_LIST:
                if (headoflist) {
                    pruleitem = m_pMTO->m_prule_itemhead;
                    done = FALSE;
                    while ((!done) && (pruleitem ! = null)) {
                        if pruleitem->iid = = iid {
                            ppv = pruleitem->prule;
                            done = TRUE;
                        } else pruleitem = pruleitem->pnext; }
                } else {  // . . . start from tail and work backwards
                          using
                          // pruleitem = pruleitem->pprev;
                };
                break;
            default:
                // use the same steps as for the normal list starting
                from the head
        }
    } private:
    MTO    *m_pMTO;
};    // end of class definition for MT object
friend MT;
MT    m_MT;
```

Code Table 13

```
public:
    virtual HRESULT QueryInterface(REFIID iid, void **ppv)
    {   IRule *prule;
        ruleitem *pruleitem;
        boolean done = TRUE, foundrule = FALSE;
        switch (iid) {
            case IID_IMultiType:
                *ppv = &m_MT;
                m_punkOuter->AddRef();
                break;
            case IID_IUnknown:
                *ppv = this;
                AddRef();
                break;
            default:
                done = FALSE;
                // search through the rule list for the first
                matching IUnknown interface
                // and invoke it as the selection rule to access the
                combining rule for the
                // requested interface
                pruleitem = m_prule_itemhead;
                while ((foundrule = = FALSE) &&
                (pruleitem ! = null)) {
                    if pruleitem->iid == IID)_IUnknown {
                        prule = pruleitem->prule;
                        foundrule = TRUE;
                    } else pruleitem = pruleitem->pnext;
                }
                if (foundrule) {   // get and call its QueryInterface
                method
                    prule-> QueryInterface(IID_IUnknown,
                    pselect);
                    done = pselect-> QueryInterface(iid,
                    ppv);
                }
                else {           // find the combining rule on the
                                 rule list and return it if it exists
                                 // this code is the default selection
                                 rule if one is not provided
                    pruleitem = m_rule_itemhead;
                    foundrule = FALSE;
                    while ((foundrule == FALSE) &&
                    (pruleitem ! = null)) {
                        if pruleitem->Iid == iid {
                            prule = pruleitem->prule;
                            foundrule = TRUE;
                        } else
                            pruleitem = pruleitem->pnext;
                    }
                    if (foundrule) {   // find the re-
                    quested interface and return it
                        prule->QueryInterface(iid,
                        ppv);
                    else // no combining rule exists so
                    just return 1st interface found
                        done = FALSE;
                        // search through all lists for the
                        first matching interface
                        if ((m_MT->Enum(1, iid,
                        OVERRIDE_LIST, true,
                        ppv))
                            == FALSE)
                            {done = TRUE };
                        else if ((m_MT->Enum(1, iid,
                        NORMAL_LIST, true, ppv))
                            == TRUE) { done = TRUE };
                        else if  ((m_MT->Enum(1, iid,
                        DEFAULT_LIST, true,
ppv))
                            == TRUE) { done = TRUE };
                }
                break;
        }
        return done;
    }
```

```
    virtual void AddRef() { m_refcount++;}
    virtual void Release() {if(--m_refcount == 0) delete this;}
private:
    IUnknown            *m_punkOuter;
    int                 m_refcount;
    struct item {
        REFIID iid;
        void                *pobj;
        item                *pnext;
        item                *pprev };
    item        *m_pnormal_itemhead = null,
                *m_*pnormal_itemtail = null,
                *m_pdefault itemhead = null,
                *m_pdefault_itemtail = null,
                *m_poverride_itemhead = null,
                *m_poverride_itemtail = null;
    struct ruleitem {
        REFIID iid;
        IRule   *prule
        ruleitem *pnext
        ruleitem *pprev };

ruleitem *m_prule itemhead = null, *m_prule_itemtail = null;

};   // end of class definition for MTO object class MyQI: public IUnknown
{
private:
    void MyQI: m_R(this) {any other initialization code } class R: public IRule
    {
    public:
        void R(MyQI *pMyQI) {m_pMyQI = pMyQI) }
        // . . . IUnknown methods are also implemented here which
        call the controlling
        // IUnknown methods for the enclosing object (public methods
        shown below)

virtual HRESULT Init (IMultitype* pMTO)
        {m_pMyQI->m_pMTO = pMTO}
    private:
        MyQI    *m_MyQI;
    };    //end of class R definition friend R;
    R    m_R;

int                 m_refcount;
    IMultitype          *m_pMTO;

public:
    virtual HRESULT QueryInterface (REFIID iid, void **ppv)
    {   IRule *prule;
        boolean done = TRUE, foundrule = FALSE;

switch (iid) {
            case IID_IRule:
                *ppv = &m_R;
                AddRef();
                break;
            case IID_IUnknown:
                *ppv = this;
                AddRef();
                break;
            default: // this is the same as code for our default rule for
            IUnknown
                // that knows how to search the list of an MTO
                object
                foundrule = m_pMTO->Enum(l, iid, RULE_LIST,
                true, prule);
                        if(foundrule)    // return the combining rule for
the requested IID
                            {prule->QueryInterface(iid, ppv);}
                        else  {  // no combining rule exists so just return
```

Code Table 13

```
        1st interface found
        done = FALSE;
        // search through all lists for the first matching
        interface
        if ((m_MTO->Enum(1, iid, OVERRIDE_LIST,
        true, ppv))
                == TRUE) {done =TRUE };
        else if ((m_pMTO->Enum(1, iid, NORMAL_LIST,
        true,
                ppv)) == TRUE) { done = TRUE};
        else if ((m_pMTO->Enum(1, iid,
        DEFAULT_LIST, true,
                ppv)) == TRUE) { done = TRUE };
    };
    break;
};
return done;
} virtual void AddRef() { m_refcount++;} virtual void Release() {if(--m_refcount == 0) delete this;}
};
```

Code Table 13 contains C++ pseudocode for a preferred class definition for a multitype object that has been enhanced to support a list of rule objects. Recall that these rule objects can either contain combining rules for combining requested interfaces of a multitype object or a selection rule for selecting a rule object (containing a combining rule) from the list of rule objects. Each rule object implements an instance of the IRules interface for hooking the rule object into a multitype object. Each rule object also implements an instance of the interface for which the rule object is providing a combining rule. For example, to coordinate printing all of the enclosed aggregated objects, a rule object that implements a combining rule for the IPrint interface can be provided. Such a rule object contains an implementation of the IRules interface and an implementation of the IPrint interface. This specific example is discussed further below with reference to Code Table 14.

Code Table 13 also shows C++ pseudocode for a preferred class definition for a rule object that contains a selection rule for selecting rule objects from a list of rule objects. To simplify the example, the rule provided by this rule object is similar to the default code used by a multitype object to access rule objects from the list of rule objects (as defined by MTO::QueryInterface). However, one skilled in the art would recognize that this selecting rule object could implement any rule for accessing rule objects.

As shown in Code Table 13, a multitype object implements two interfaces, IMultitype and IUnknown. These interfaces are essentially the same as those described in Code Table 11, except, as noted in the following description. The fundamental change from Code Table 11 shown in Code Table 13 is that the method QueryInterface of the controlling IUnknown (MTO::QueryInterface) no longer searches through the three lists of enclosed interfaces for a matching interface according to a fixed set of rules. (The fixed rules shown in FIG. 11 amount to returning the first found interface from among the override, normal, and default lists in that order.) Instead, once it determines that an interface is requested that is not implemented by the MTO object itself, MTO::QueryInterface defers the request to a rule object corresponding to the requested interface, if one exists on the MTO object's list of rule objects. The found rule object is then responsible for either providing an implementation of the requested interface or returning an interface from the MTO object's three lists of aggregated interfaces. Thus, a client application can change the behavior of method QueryInterface of the controlling IUnknown of the aggregated object by providing its own rule objects for retrieving or combining particular interfaces. These rule objects can be implemented independent of the implementation of the multitype object because they can use a public enumeration method provided by the multitype object to access the enclosed interface and rule lists. In addition, a client application can change the selection rule used by MTO::QueryInterface for finding the rule object corresponding to the requested interface by providing a rule object for the IUnknown interface.

In addition to the methods AddObject and AddInterface already described with reference to Code Table 11, the class MTO provides two methods for handling rule objects: AddRule and Enum. The method AddRule performs similarly to AddInterface. The method AddRule creates a new list item for the list of rule objects and initializes this item to point to the interface identifier and the IRule interface of the rule object passed as input parameters. The method then inserts the new list item in the list of rule objects and invokes the method Init of the IRule interface pointed to by the new list item in order to give the rule object access back to the MTO object. Such access is used by the rule object to invoke the method Enum to access the other lists of interfaces.

As shown, the method AddRule adds a new rule object to the end of the list of rule objects. In addition, the QueryInterface methods using the list of rule objects assume that there is only one rule object per interface identifier (or that rather the first one found is valid). Therefore, some error checking or order control is preferably implemented. One skilled in the art will recognize that, like the other enclosed interface lists, a new rule object could be inserted into either the head or the tail of the list. Also, the method AddRule could be changed to pass in a parameter indicating where to add the new rule object similar to AddObject and AddInterface. Alternatively, the rule list items could be implemented identically to the other list items and the method AddInterface could be used to insert rule objects into the list of rule objects. One skilled in the art would recognize that many other techniques are possible and that, in an abstract sense, rule objects are also dynamically aggregated objects.

The class MTO provides the method Enum for searching and retrieving a specified interface. Rule objects for combining rules can use this method to retrieve interfaces from the three aggregated interface lists. In addition, rule objects for selecting combining rules can use this method to retrieve rule object IRule interfaces from the list of rule objects. As shown, the method Enum returns the i'th occurrence of an interface matching a requested interface identifier from a specified list. The method starts from the head or tail of the list as specified in the invocation. In an alternate embodiment, the enumerator is implemented as four separate methods: one per list enumerated.

For the normal, default, and override lists, the method Enum examines each list item from the specified list until it finds the requested interface identifier or it exhausts the items in the list. During examination, if a list item points to an entire object, then the method Enum invokes the method QueryInterface of the object pointed to by the list item to potentially retrieve and return the requested interface. Otherwise, if the list item points to an interface other than IUnknown, the interface identifier pointed to by the list item is compared directly to the interface identifier requested, and, if they match, the interface pointed to by the list item is returned. If a list item fails to produce a matching interface, then the method continues to search the remainder of the specified list.

The method Enum provides slightly different behavior for searching and retrieving from the list of rule objects. Instead of returning the requested interface identifier, the method uses the interface identifier to find a matching item on the list of rule objects and then returns a pointer to the IRule interface of the rule object corresponding to the requested interface identifier.

In Code Table 13, the method QueryInterface of the MTO enclosing object has been modified to support the list of rule objects. The method first determines whether the interface requested in an input parameter is implemented by the MTO object itself. If so, the method returns this interface. Otherwise, the method retrieves and invokes a selecting rule if one exists on the list of rule objects. Finally, if no selecting rule exists, the method QueryInterface provides default selection code.

A rule object provides a selecting rule if it is added to the list of rule objects under the IUnknown interface identifier. Preferably, this interface identifier is reserved for this purpose. In one embodiment, the first such rule object found is retrieved as the selecting rule. If it exists, the retrieved selecting rule is responsible for searching for and retrieving a combining rule or, if no combining rule exists, searching for and retrieving an interface from the three lists of aggregated interfaces. The retrieved selecting rule is invoked by querying the rule object corresponding to the IUnknown interface identifier for its IUnknown interface (using the IRule interface) and then invoking the method QueryInterface of this retrieved IUnknown interface. Note that the retrieved IUnknown interface is the controlling IUnknown interface of the rule object.

If no selecting rule exists, the method MTO::QueryInterface provides default selection code. This default selection code returns a combining rule for the requested interface if one exists, or returns the first matching interface found from the normal, override, and default lists in that order. (The default selection code when no combination rule exists behaves similarly to the method MTO::QueryInterface.) The rule object implementing the combining rule is then responsible for either providing an implementation of the requested interface or returning an interface from the MTO object's three lists of aggregated interfaces.

As an example, Code Table 13 illustrates an implementation for a rule object that provides a selection rule for selecting rule objects from the list of rule objects. Class MYQI is a rule object implementing an IRule interface and an IUnknown interface. For ease of understanding, class MyQI is shown as a non-aggregatable object. The IRule interface provides a method Init, for maintaining a pointer to the enclosing multitype object (MTO) containing this rule object. This MTO pointer can be later used to access the method Enum of the IMultitype interface in order to access the aggregated interfaces and objects. The method Init is invoked by AddRule when a rule object is added to the list of rule objects. The IUnknown interface provides an implementation of QueryInterface that knows how to select a combining rule object from the list of rule objects. As shown, MyQI::QueryInterface provides the identical functionality to that provided by MTO::QueryInterface. However, the implementation differs in that MyQI::QueryInterface uses the method Enum to find a combining rule instead of searching the list itself. One skilled in the art would recognize that MTO::QueryInterface could have been implemented identically.

An example of using a MyQI rule object is shown in the method MTO::MTO. When the multitype object is instantiated, the constructor MTO::MTO is invoked. This constructor creates a new rule object for the IUnknown interface using the MyQI class definition and then adds this rule object to the list of rule objects using the method AddRule. One skilled in the art will recognize that adding a rule object implementing a selection rule can really be done at any time.

Code Table 14

```
class IPrint: public IUnknown
{    virtual boolean Print (void **ppobj) = 0;
} class myPrintRule: public IUnknown
...
private:
...
    void myPrintRule: m__R(this), m__P(this) {/*any other initialization
    code*/ } class R: public IRule
    {
    public:
        void R(myPrintRule *pmyPrintRule)
        {m__pMyRule = pmyPrintRule) }
        // . . . IUnknown methods are also implemented here
        which call the controlling
        // IUnknown methods for the enclosing object (public methods
        shown below)
        virtual HRESULT Init (IMultitype *pMTO)
        {m__pMyRule→m__pMTO = pMTO}
    private:
        myPrintRule    *m__MyRule;
    };   //end of class R definition friend R;
    R    m__R;

class P: public IPrint
    {
    public:
        void P(myPrintRule *pmyPrintRule)
        {m__MyRule = pmyPrintRule) }
        // . . . IUnknown methods are also implemented here which
        call the controlling
        // IUnknown methods for the enclosing object (public methods
        shown below)
        virtual void Print (void * pobj)
        // call each aggregated object print routine on each list in
        order of overriding
        // and then normal list and only call print routine from default
        list if no print
        // routine exists on normal list
        {    IID__IMultitype    *p__iMT;
            IID__IPrint        *p__iprint;
            int    i,j;
            p__iMT = m__pMyRule->m__pMTO;
            for (i = 1; p__iMT->Enum(i, IID__IPrint,
            OVERRIDE__LIST, true, &p__iprint); i++)
            p__iprint->Print(pobj);
            for (j = 1; p__iMT->Enum(j, IID__IPrint,
            NORMAL__LIST, true, &p__iprint); j++)
            p__print->Print(pobj);
            if ((i==1) && (j==1) &&
            (p__iMT->Enum(1,IID__IPrint, DEFAULT__LIST,
            true, &p__print))) p__print->Print (pobj),
            };
        } private:
        myPrintRule            *m__pMyRule;
    };
    friend P;
    P    m__P;
```

Code Table 14 -continued

```
    int           m_refcount;
    IMultitype    *m_pMTO;

public:
    ...
    virtual HRESULT QueryInterface(REFIID iid, void **pvv)
    {    ret = TRUE;
         switch (iid) {
             ...
             case IID_IPrint:
                 *ppv = &m_P;
                 AddRef();
                 break;
             case IID_IRule:
                 *ppv = & m_R;
                 AddRef();
                 break;
             case IID_IUnknown:
                 *ppv = this;
                 AddRef();
                 break;
             ...
         }
         return ret;
    } virtual void AddRef() { m_refcount++;} virtual void Release() {if (--m_refcount == 0) delele this;}

};
```

Code Table 14 shows C++ pseudocode for an example of using a multitype object and a rule object to provide overriding behavior for a set of aggregated objects or interfaces. Typically, when a set of objects of different types is aggregated, each object provides its own print method which knows how to print the object. Code Table 14 shows C++ pseudocode for a preferred class definition of a rule object that provides a combination rule for the IPrint interface. The provided IPrint interface includes a method Print, which invokes the print method of each enclosed object or interface in an enclosing multitype object.

Class myPrintRule provides an implementation for at least two interfaces, as do all rule objects: in this case, IRule and IPrint. The IRule interface provided by class myPrintRule is functionally identically to class MyQI, already discussed with reference to Code Table 13. The IPrint interface simply provides a combining rule that enumerates through the three lists of aggregated objects in a multitype object searching for other IPrint interfaces and invoking their Print routines when found. As discussed with reference to Code Table 13, after this rule object is added to the list of rule objects in a multitype object, the method QueryInterface of the controlling IUnknown of the multitype object will preferably return a pointer to this combining rule IPrint interface when a client application invokes QueryInterface requesting IID_Print on the aggregated object. As a result, when the client application invokes the method Print, the method Print implemented by this rule object will instead by invoked to ensure that the aggregated object prints its components correctly.

Code Table 15

```
pPrintRule = new(myPrintRule);        // make a IPrint interface
                                      combining rule
pPrintRule->QueryInterface(IID_IRule, prule);
```

Code Table 15 -continued

```
p_MTO->QueryInterface(IID_IMultitype, p_MT);
p_MT->AddRule(IID_IPrint, prule);     // add it to the Multitype object
```

Code Table 15 shows a C++ pseudocode sequence of calls that installs the rule object defined in Code Table 14. First, a new instance of the class myPrintRule rule object is created. Second, the IRule interface of the new rule object is retrieved for later use. Third, after obtaining from somewhere a pointer to a multitype object (p_MTO), the IMultitype interface of the multitype object is retrieved. Finally, the method AddRule of this retrieved IMultitype interface is invoked passing it the interface identifier for the new rule object (IID_IPrint) and a pointer to the IRule interface of the new rule object.

In a preferred embodiment, an aggregated object is persistently stored using the same mechanism illustrated for printing. Specifically, a multitype object provides a combination rule object for the IPersistFile interface or for any other interface responsible for saving and retrieving objects. (The IPersistFile interface provides methods for saving and loading objects.) In this manner, the multitype object is able to override the saving functionality of the enclosed objects and interfaces to ensure that the whole aggregated object is saved. The combination rule preferably saves any data structures that the multitype object needs first and then invokes the method Save on each of the enclosed IPersistFile interfaces or objects. Thus, in order to participate in saving the aggregate object, a client program adds the IPersistFile interface of an object to be enclosed, or encloses the entire object. No separate storage is needed in a separate file: the multitype object can store its own data in an analogous manner to how object data is stored within a single file.

In an alternate embodiment that implements only one list of aggregated interfaces or objects and rules (instead of three lists plus the list of rule objects), the multitype object needs no storage of its own. No storage aside from that used by the aggregated objects is necessary because the multitype object can recreate the single list by examining the ordering and indexing information of the aggregated objects in the hierarchical persistent storage structure. However, a multitype object that implements multiple interface lists typically needs to store information to distinguish which interface instances are pointed to by which list.

The present embodiment of the current invention assumes that when the controlling IUnknown::QueryInterface method invokes the QueryInterface methods of the enclosed objects such invocation is performed synchronously. That is, the enclosed object QueryInterface method returns before the controlling IUnknown::QueryInterface method invokes the next enclosed object QueryInterface method. In an alternate embodiment, the controlling IUnknown::QueryInterface method calls the enclosed object QueryInterface methods asynchronously, not waiting for their return. Instead, standard interprocess communication mechanisms are used to inform the controlling routine when the enclosed object method has completed. Such an embodiment is useful in a networking or multiprocessor environment.

A typical application of the present invention for dynamic aggregation is for a user to combine instances of objects into a more powerful object using a program that has been developed with knowledge of dynamic aggregation. For example, suppose, using the spreadsheet interface example presented in the background section, that a software vendor ships a spreadsheet product from which a user can create aggregatable spreadsheet objects that only support the IBasic interface for basic manipulation of a spreadsheet. (That is, using this product, a user can create instances of the IBasic interface, which are spreadsheet objects.) Further suppose that another software vendor ships a database product from which a user can create aggregatable database query objects. These aggregatable database query objects support the IDatabaseQuery interface, which for example includes a method DoQuery to run a query and a method DefineQuery to enable a user a specify a query. When attached to other objects that can serve as input data, these database query objects can be invoked to query the attached input data. Also suppose that resident on the computer system is a program, for example a file manager, that manages objects and that knows how to create multitype objects and aggregate other objects and interfaces together. To do this task, the file manager knows how to create a multitype object that provides an implementation of the IMultitype interface.

Figure 12:
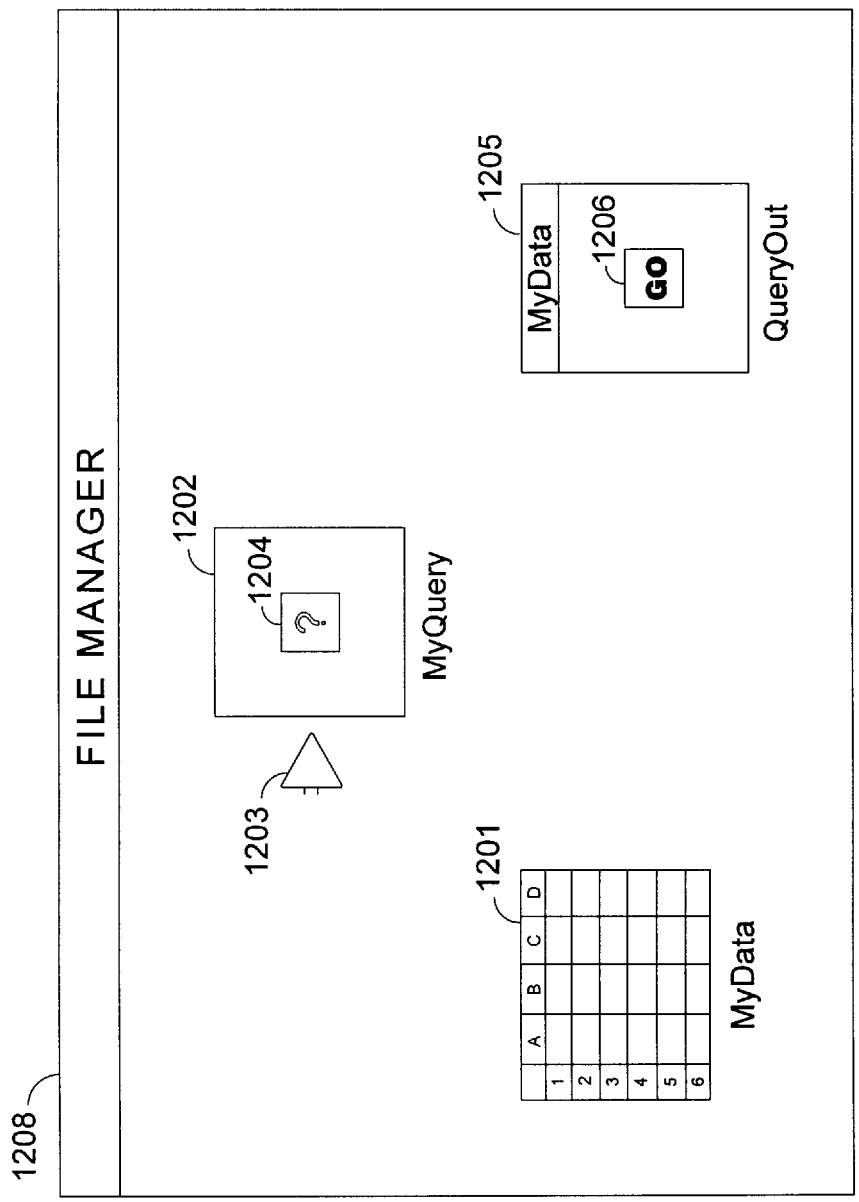
FIG. 12 is a pictorial representation of a spreadsheet object and a database query object, which can be aggregated together to create an attached database query object.

FIG. 12 is a pictorial representation of a spreadsheet object and a database query object, which can be aggregated together to create an attached database query object. To create a more powerful object that can perform a specified query on a specified database (the attached database query object 1205), the user first creates, using the spreadsheet product, an instance of a spreadsheet object 1201, which the user wants to use as input data. Then, the user creates an instance of a database query object 1202 using the database product. The user then invokes the method DefineQuery of the IDatabaseQuery interface by pressing the define button 1204 and enters text for the database query using a database language; for example, the SQL language. Next, the user invokes the file manager 1208. Using the file manager, the user selects the spreadsheet object 1201 and the database query object 1202 and requests that the file manager 1208 aggregate them. The user might indicate this request, for example, by dragging and dropping the display representation of the spreadsheet object 1201 onto the data input port 1203 of the display representation of the database query object 1202.In response to the user's request, the file manager 1208 instantiates a new attached database query object 1205 by instantiating an enclosing multitype object and invoking the method IMultitype::AddObject for both the spreadsheet object 1201 and the database query object 1202. The file manager 1208 also passes to both the spreadsheet object 1201 and the database query object 1202 a pointer to the controlling IUnknown interface of the newly instantiated multitype object. The user can then invoke the attached database query object by selecting the "Go" button 1206, to perform the specified query on the attached spreadsheet data.

One skilled in the art would recognize that once an object is aggregated, it is subject to the rules of the enclosing object. Thus, the behavior of spreadsheet object 1201 and the database query object once enclosed may change.

Figure 13:
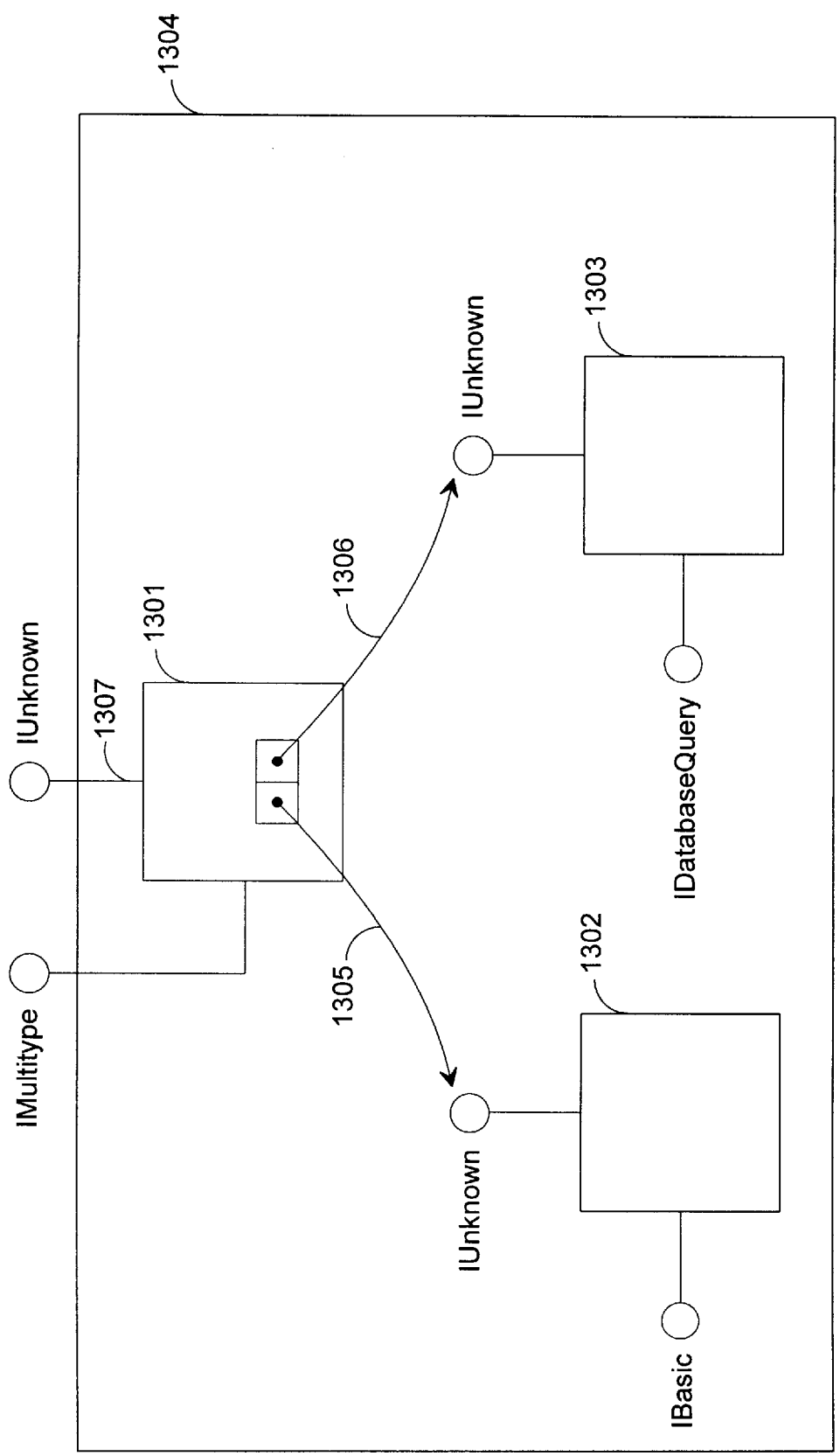
FIG. 13 is a block diagram of an aggregated attached database query object.

FIG. 13 is a block diagram of an aggregated attached database query object. The aggregated object 1304 corresponds to the attached database query object described with reference to FIG. 12. The aggregated object 1304 comprises a multitype object 1301, a spreadsheet object 1302, and a database query object 1303. The multitype object 1301 is created, as described above, in response to the user request to aggregate spreadsheet object 1302 and database query object 1303. During the process of aggregation, the multitype object creates pointers 1305 and 1306 to the aggregated objects and passes to the objects to be aggregated a pointer to the controlling IUnknown interface. Later, when the user presses the "Go" button (1206 in FIG. 12), the controlling IUnknown interface of the multitype object 1307 is invoked to locate and invoke the method DoQuery of the IDatabaseQuery interface of the database query object 1303 using the above-described embodiments. The method DoQuery can then query for and invoke a (known) desired method of the spreadsheet object 1302 by searching for a (known) desired interface identifier of the spreadsheet object 1302 using the method QueryInterface. (To recall, the invocation of the method QueryInterface will get forwarded to method QueryInterface of the controlling IUnknown 1307 the multitype object 1301, which will locate the desired interface if it exists.) Thus, the database query object 1303 is able to invoke the methods of the spreadsheet object 1302without having access to the compile time definitions of the interfaces of the spreadsheet object 1302 as long as it knows the name (and parameters) of the method and the interface identifier.

Although the present invention has been described in terms of a preferred embodiment, it is not intended that the invention be limited to this embodiment. Modifications within the spirit of the invention will be apparent to those skilled in the art. The scope of the present invention is defined by the claims which follow.

We claim:

1. A method in a computer system for adding a plurality of interfaces, each interface implemented by an object being aggregatable into an enclosing object, the method comprising the steps of:

creating an instance of an enclosing object, the enclosing object having an add object function member for adding all of the exposed interfaces of an object to the enclosing object and a query function member for retrieving a reference to an added interface;

creating an instance of an object to be enclosed within the enclosing object, the object to be enclosed being aggregated into the enclosing object, the object to be enclosed having a plurality of exposed interfaces and having a query function member for retrieving a reference to an exposed interface; and invoking the add object function member of the enclosing object, wherein the plurality of exposed interfaces of the object to be enclosed is added to the enclosing object, whereby when the query function member of the enclosing object is invoked, the query function member of the enclosing object returns a reference to an exposed interface from the added plurality of exposed interfaces.

2. A method in a computer system for combining a plurality of interfaces, the interfaces implemented by a plurality of objects being aggregatable into an enclosing object, the method comprising the steps of:

creating an instance of an enclosing object, the enclosing object having an add interface function member for adding interfaces to the enclosing object and a query function member for retrieving a reference to an added interface;

creating an instance of a first object to be enclosed within the enclosing object, whereby the first object is passed a reference to the enclosing object, the first object having an exposed interface and having a query function member for retrieving a reference to the exposed interface;

creating an instance of a second object to be enclosed within the enclosing object, whereby the second object is passed a reference to the enclosing object, the second object having an exposed interface;

invoking the add interface function member of the enclosing object, wherein the exposed interface of the first object is added to the enclosing object, thereby enclosing the first object; and invoking the add interface function member of the enclosing object, wherein the exposed interface of the second object is added to the enclosing object, thereby enclosing the second object, whereby when the query function member of the enclosed first object is invoked, the query function member of the enclosed first object returns a reference to the added exposed interface of the enclosed second object.

3. The method of claim 2, wherein the exposed interface of the enclosed second object overrides an interface of the enclosed first object.

4. The method of claim 2, wherein the exposed interface of the enclosed second object invokes an interface of the enclosed first object.

5. The method of claim 2, wherein the exposed interface of the enclosed second object is a default interface.

6. The method of claim 2, wherein the enclosing object provides a default interface for an enclosed object.

7. The method of claim 2, wherein the enclosing object provides an interface that overrides an interface of an enclosed object.

8. The method of claim 2, wherein the enclosing object has no knowledge of the interfaces exposed by enclosed objects.

9. The method of claim 2, wherein the invocation of the query function member of the enclosed first object is performed asynchronously.

10. The method of claim 2, wherein the invocation of the query function member of the enclosed first object is performed synchronously.

11. The method of claim 2, the enclosed first object containing a pointer to the enclosing object, the second object having a query function member for retrieving a reference to the exposed interface of the second object, and further including the steps of:

first, invoking the query function member of the enclosed first object requesting an exposed interface of the second object;

second, retrieving a reference to the query function member of the enclosing object through the pointer to the enclosing object contained by the enclosed first object;

third, invoking the query function member of the enclosing object, passing the requested interface;

fourth, from the query function member of the enclosing object, invoking the query function member of the enclosed second object, passing the requested interface; and fifth, from the query function member of the enclosed second object, returning a reference to the requested interface.

12. The method of claim 2, the computer system having a device for persistent storage, further including the steps of after enclosing an object into the enclosing object, thereby creating an aggregate object, storing the aggregate object on the persistent storage device; and subsequently loading the stored aggregate object from the persistent storage device.

13. The method of claim 12, the enclosing object having a retrieval data structure to keep track of enclosed objects, wherein the retrieval data structure can be created from the storage structure of the enclosed objects, and wherein the step of storing the aggregate object only stores the enclosed objects.

14. The method of claim 12, the enclosing object having a plurality of retrieval data structures for ordering retrieval of exposed interfaces, wherein the retrieval data structures can be persistently stored in the same file as the enclosed objects, and wherein the step of storing the aggregate object also stores the plurality of retrieval data structures.

* * * * *